Dec. 18, 1956 T. B. TYLER 2,774,257
MOTION CONVERTING AND TRANSMITTING APPARATUS
Original Filed July 6, 1948 6 Sheets-Sheet 1
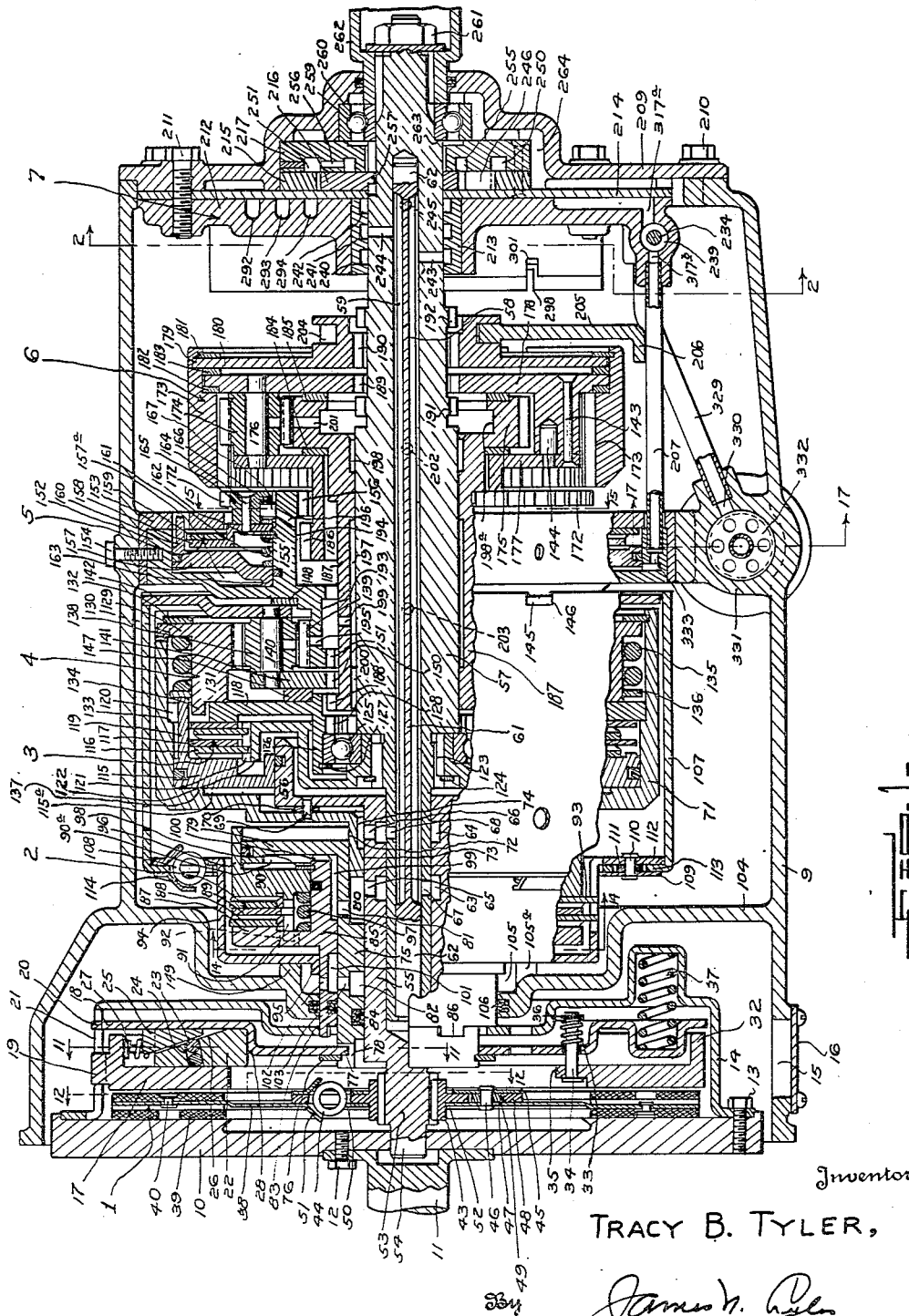
Inventor
TRACY B. TYLER,
By James N. Tyler
Attorney

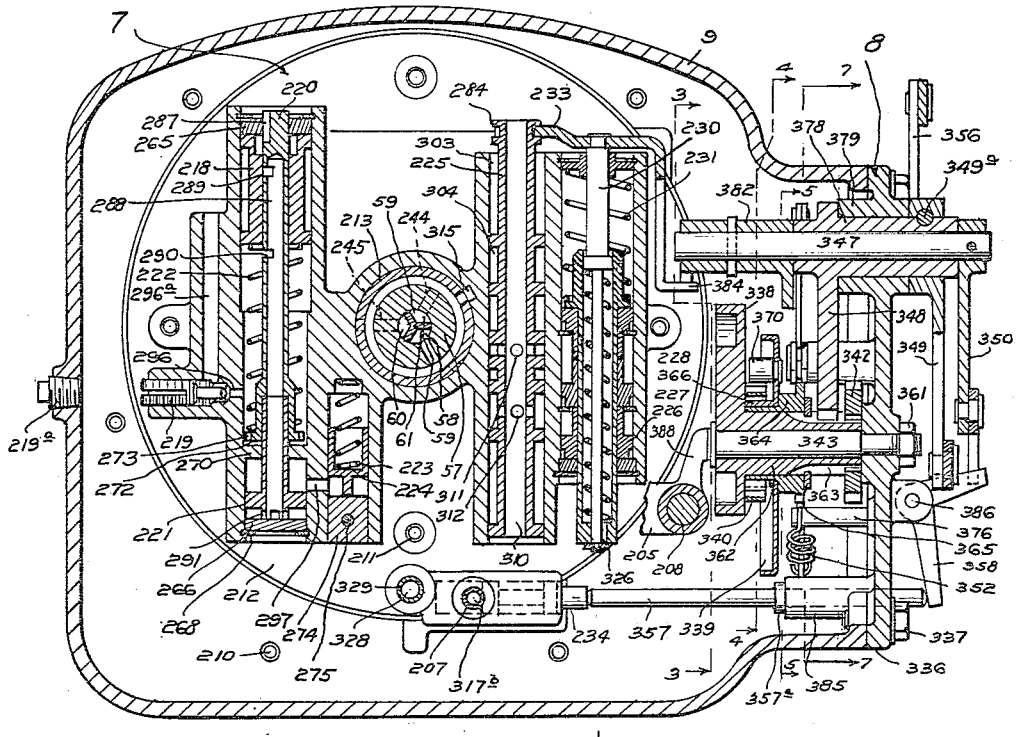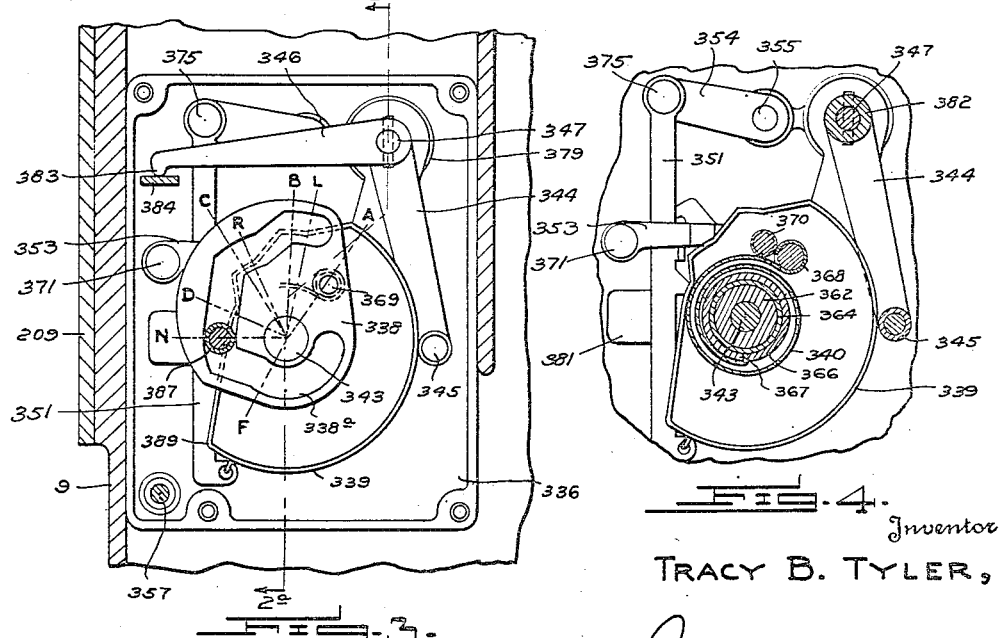

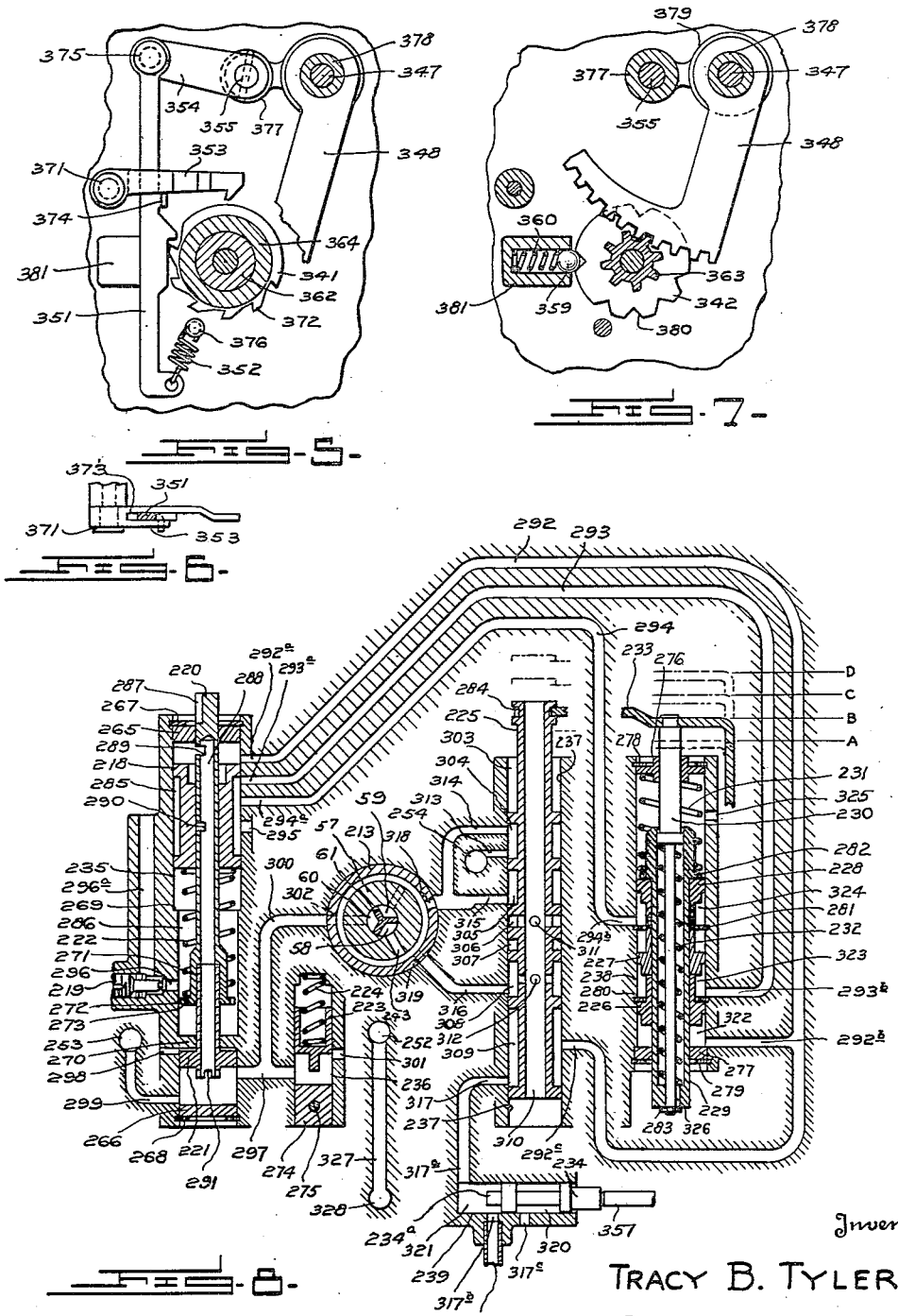

Dec. 18, 1956 T. B. TYLER 2,774,257
MOTION CONVERTING AND TRANSMITTING APPARATUS
Original Filed July 6, 1948 6 Sheets-Sheet 4
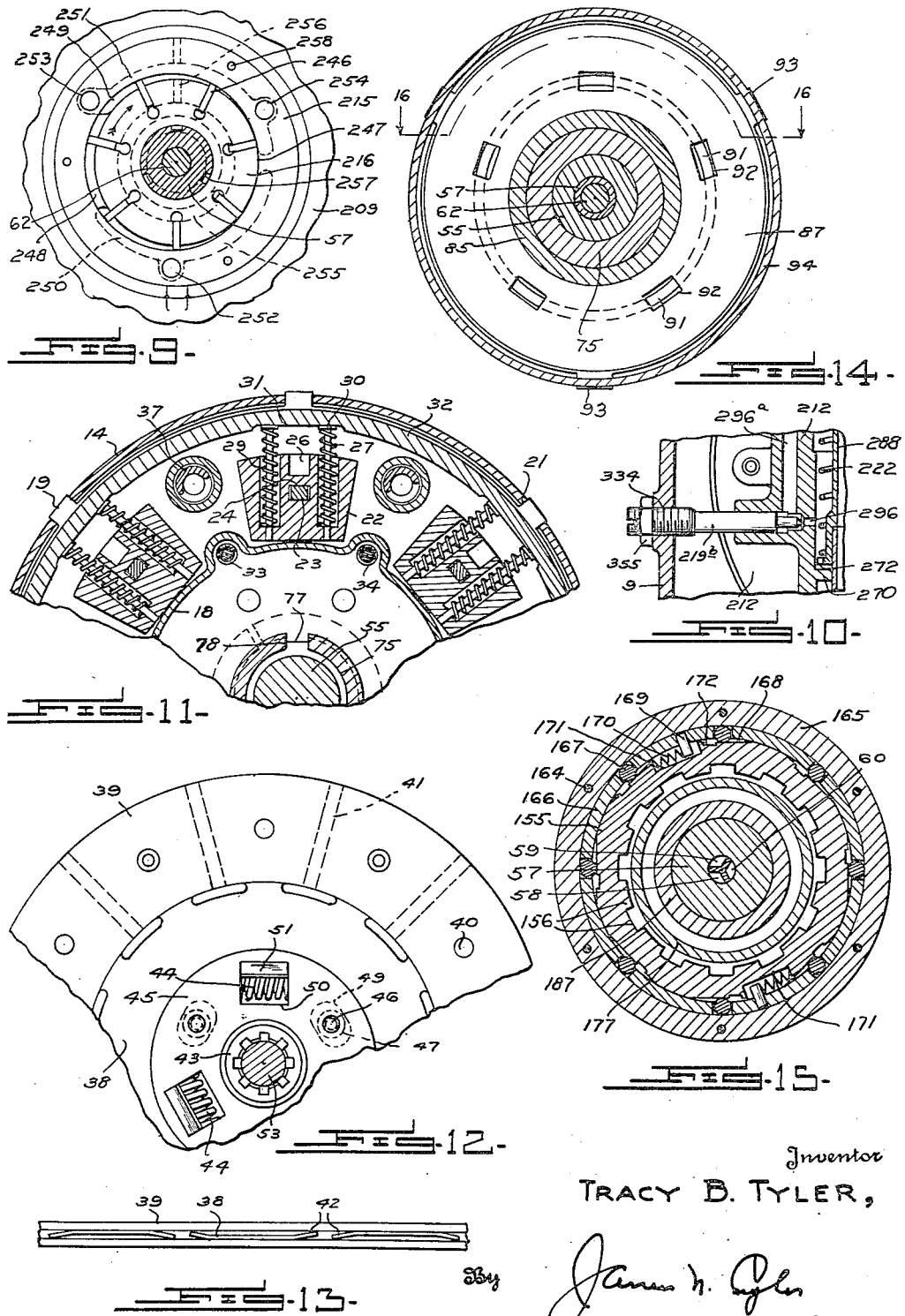

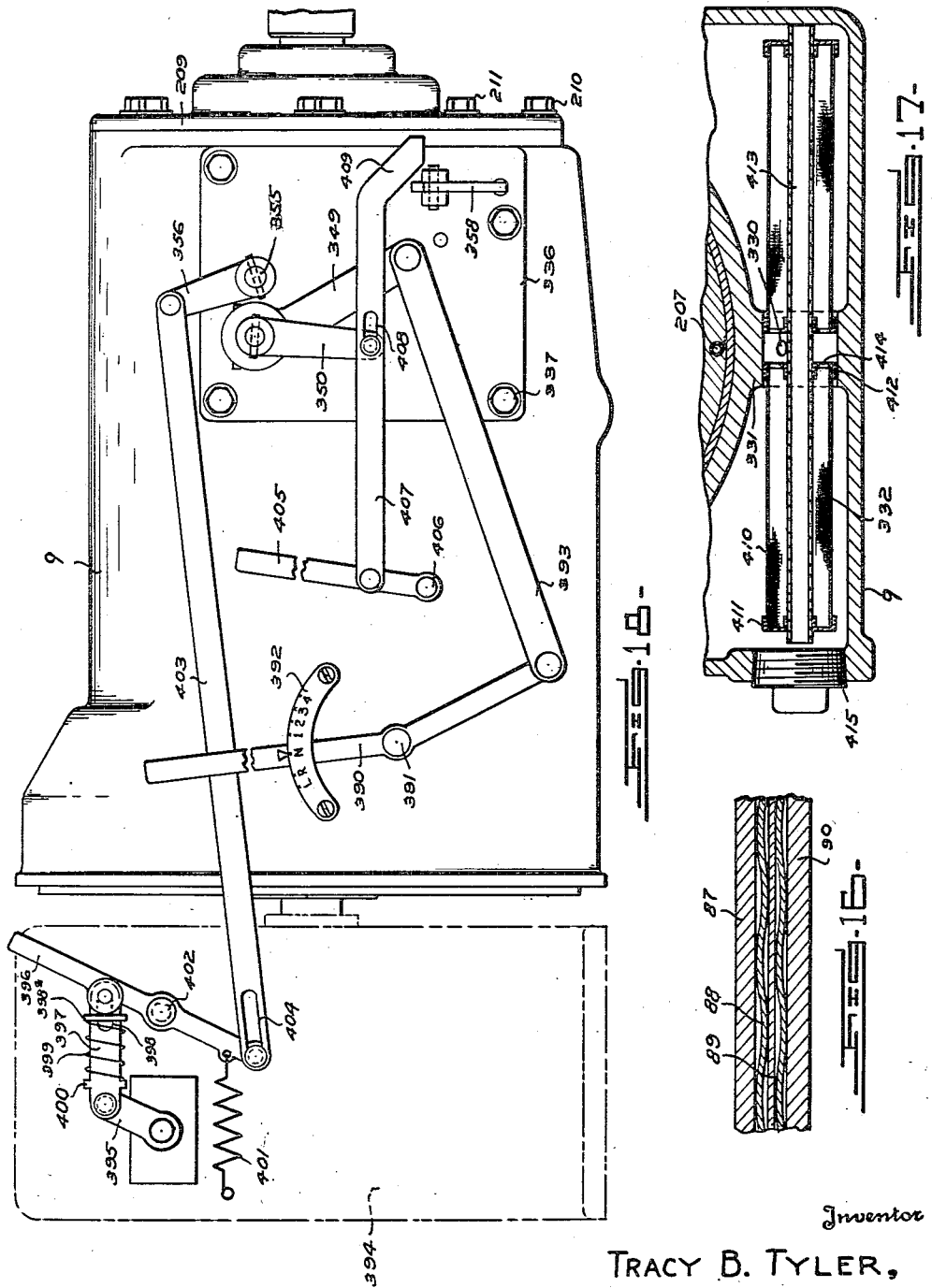

Dec. 18, 1956     T. B. TYLER     2,774,257
MOTION CONVERTING AND TRANSMITTING APPARATUS
Original Filed July 6, 1948     6 Sheets-Sheet 6
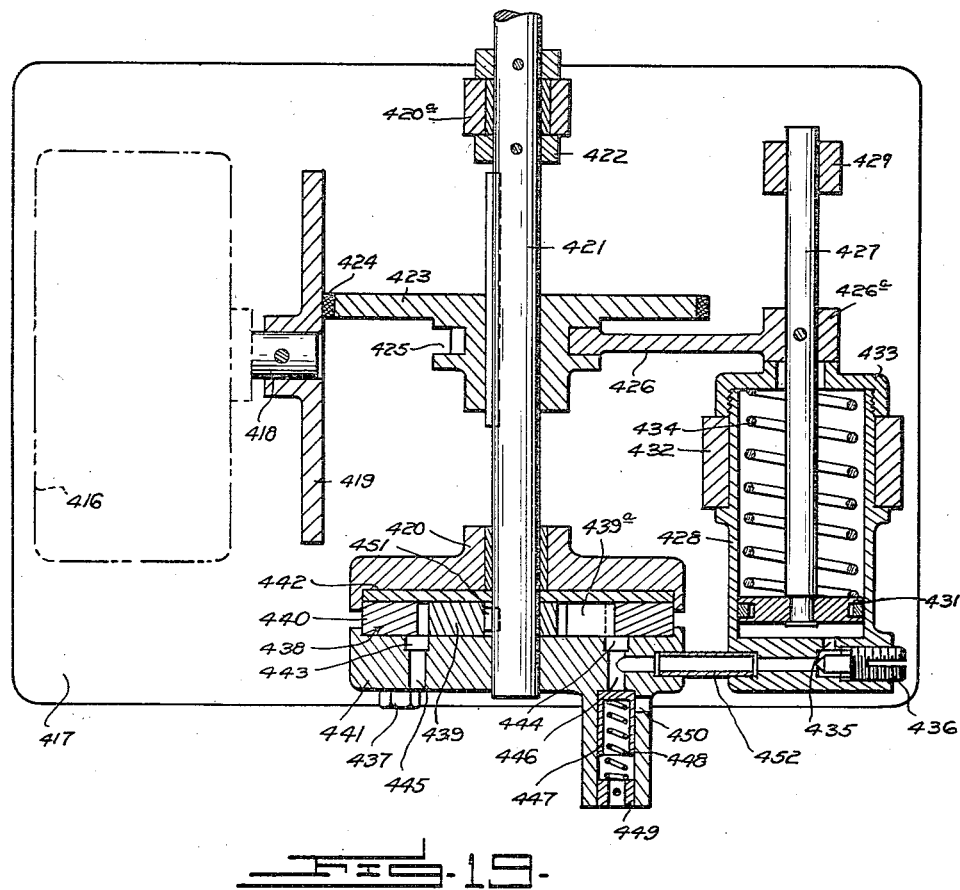
FIG-19-
Inventor
TRACY B. TYLER,
By James N. Tyler
Attorney United States Patent Office 2,774,257
Patented Dec. 18, 1956

2,774,257

MOTION CONVERTING AND TRANSMITTING APPARATUS

Tracy Brooks Tyler, Miami Beach, Fla.

Substituted for application Serial No. 37,128, July 6, 1948. This application July 7, 1950, Serial No. 172,599

46 Claims. (Cl. 74—752)

This invention relates to improvement in apparatus for converting and transmitting motion and/or torque and to improved means for manually and/or automatically actuating and controlling such apparatus. More specifically, it relates to improvement in such apparatus and devices which comprise transmission elements actuatable to convey continuous or intermittent motion in relatively variable drive ratio from a prime mover to a drivable element or elements, and which include manual and/or automatic operating means to actuate the said transmission elements and thereby vary the drive ratio, and is a substitute for my application filed July 6, 1948, bearing Serial No. 37,128 and abandoned October 12, 1949.

An important object of the invention is to provide in such apparatus a system wherewith the transmitted drive or motion ratio may be automatically varied by time limit controlled actuating means, instead of by speed acceleration influenced actuating means as has heretofore been common practice. Stated in other terms, this object is to provide a system whereby when the actuating means is once set into effect the process of automatically varying the drive from a primary ratio to a final ratio functions through a limited period of time irrespective of any concurrent speed variation of the driving or drivable transmission elements. Another object related to this first stated object is the provision of a system which, after effectuation of a primary drive ratio, permits the speed of the drivable transmission element to be accelerated either slightly or greatly before the final drive ratio automatically becomes effected.

Another object of the invention is to provide in such apparatus an arrangement of mechanism whereby a maximum number of forward drive ratios and at least one reverse drive ratio are automatically or manually effectuable with a minimum number of transmission and structural elements. When this object is accomplished in such apparatus by means which include planetary gearing, as in the present preferred embodiment of the invention, the relative and combinational arrangement of gear assemblies and clutches represent major study and inventive development.

A further object is to provide such a device which is extremely simple, compact, small in size and light in weight compared to former devices of equal torque capacity which provide the same number of drive ratios.

Still another object is to provide such a device wherein drive ratio variation may be effected by time limit controlled actuating means smoothly and silently and without interruption of the transmission of motion from the driving to the drivable element.

A still further object is to provide in such apparatus means whereby a primary coupling, which is normally actuatable to effect a primary drive from a prime mover, is re-actuatable in cooperation with an actuatable secondary ratio changing coupling in such manner that the primary coupling is also operable to effect other ratios. Another object related to this last stated object is to provide an arrangement whereby such primary coupling may be of dry type while such secondary coupling may be of wet type, and isolated from one another.

A further object of the invention is to provide such apparatus wherein primary transmission of motion from a prime mover is automatically effected when the prime mover attains a sufficiently high speed and wherein motion ratio changing is then effected by automatic time limit controlled actuating means.

Still another object is to provide in such a device means whereby an element which is manually operable to regulate the speed of a prime mover, such as the throttle lever of an engine, is also adapted to function as an overcontrol means to set back any drive ratio effected by automatic actuation, the system being such that the ratios may be successively set back one ratio further each time the said element is advanced to a prescribed position without being fully retracted, and that when the element is fully retracted the automatically induced ratio again becomes effective.

A still further object is to provide in such apparatus improved means whereby one manually operable shifter element is adapted to control and/or engage or disengage, selectively and independently, a plurality of clutches which are engageable by fluid pressure and a plurality of clutches which are engageable by mechanical means.

Another object is to provide novel fluid pressure operable time controlled actuating means for motivating actions in associated apparatus in limited time interval controlled sequence, the means including operable valves, and a pump for creating fluid pressure.

Still another object is to provide in such a device improved fluid pressure controlling means for a fluid pressure motivated actuating system whereby with one movable valve, instead of several, a plurality of automatically induced actions may be effected, and which same valve is adapted to be selectively moved by manually operable over-control means counteractively to the automatically induced movement thereof.

A still further object is to provide such apparatus wherein the operating elements are supported in a housing, and wherein a pump, valves, and other elements pertaining to a fluid pressure actuating system are compactly assembled unitarily with a supporting member which is separately detachable from the housing; and wherein the manual control elements are compactly assembled unitarily on another supporting member which is also separately detachable from the housing. This construction contributes to space saving and also makes the specified elements readily accessible for adjustment or repair.

Still another object is to provide such a device wherein time controlled actuating elements are adapted to automatically effect a drive at different ratios between a prime mover and a drivable element, and wherein is included manually operable means whereby the automatically effected drive may at any time and under any conditions, irrespective of the speed of the prime mover or the drivable element, be disconnected and re-connected at will.

A further object is to provide in such a device means whereby the prime mover may be set into motion by movement inversely imparted to its drivable element, this means being of particular value when the prime mover is a device such as an internal combustion engine which must be initially motivated before it can function as a motion generator.

Another and important object of the invention is to provide such a device for a motor driven vehicle, which device provides at least four forward and one reverse drive ratios, and which is exceptionally well suited for use in a motor vehicle by features such as time controlled actuating means, simplicity and flexibility of general manual control and auxiliary manual over-control, and the simplicity, compactness, low cost, small size, and light weight of the structure, plus numerous other inventive refinements and advantages. As is well-known, the cost, size and weight of transmission apparatus for motor vehicles is a matter of prime importance and consideration. Scale structural drawings of the preferred embodiment of the device of this invention, with four forward drive ratios, as designed for adaption to a motor vehicle, show it to be nearly the same in size and weight as the now common manually actuated three speed transmission and engine clutch assembly of equal torque capacity, and considerably smaller and lighter than any other known four speed automatic or semi-automatic transmission and engine clutch assembly of equal torque capacity.

Still another object is to provide in such a device improved manually operable means whereby the drivable element may be restrained or locked against rotation in either direction when required.

Other objects to be mentioned are to provide such a device wherein two planetary gear assemblies or units are adapted to produce a suitably high reverse drive ratio by means of a novel series of connections whereby both planetary assemblies function cooperatively as speed reducers; to provide a plurality of fluid conducting passages in a shaft by means of an inserted element; and to provide such a device which is generally adapted for automatically effecting a variable ratio drive in any form of motion between any prime mover and apparatus to be driven thereby.

These and various other objects and advantages of my invention will be apparent from the following description wherein reference is made to the accompanying drawings illustrating preferred and modified embodiments of my invention, and wherein similar numerals designate similar parts throughout the several views.

In the drawings:

Figure 1 is a central vertical longitudinal sectional view of a preferred embodiment of the completely assembled device with the internal mechanism partly in elevation, Figure 2 is a transverse vertical sectional view, taken on line 2—2 of Figure 1, disclosing an automatic operating unit, and with manual controlling elements taken on a line substantially as indicated at 2a—2a of Figure 3, Figure 3 is a vertical section substantially on line 3—3 of Figure 2, illustrating a manual control unit, Figure 4 is a section on line 4—4 of Figure 2, illustrating a valve controlling cam and associated parts, Figure 5 is a section on line 5—5 of Figure 2, parts being broken away for sake of clearness, Figure 6 is a fragmentary plan view of a ratchet latch pawl embodied in the manual control mechanism, Figure 7 is a section on line 7—7 of Figure 2, Figure 8 is a view substantially as in Figure 2 but combining in diagrammatic display the ports and channels associated with the automatic operating unit, Figure 9 is a face view of a pump rotor and stator, the enclosing casing being broken away, Figure 10 illustrates a modified form of regulating screw, Figure 11 is a fragmentary transverse section on line 11—11 of Figure 1, taken through a clutch pressure plate and a reaction plate, Figure 12 is a fragmentary section on line 12—12, illustrating a clutch friction plate, Figure 13 is a fragmentary edge elevation of the clutch friction plate and its intermediate disc, Figure 14 is a transverse section on line 14—14 of Figure 1, illustrating an actuatable secondary clutch or coupling, Figure 15 is a transverse section on line 15—15 of Figure 1, illustrating a one-directional restraining device, Figure 16 is a section substantially on line 16—16 of Figure 14, Figure 17 is a transverse section on line 17—17 of Figure 1, illustrating a fluid strainer for the pump intake, Figure 18 is a semi-diagrammatic side elevation of the complete device associated with a prime mover in broken lines and illustrating the manual control linkage, and Figure 19 is a semidiagrammatic illustration of a modified embodiment of the apparatus and the automatic operating mechanism.

Referring now to the drawings, the several major operating units comprising the preferred embodiment of the invention will first be described in their consecutive order, beginning from the point of engagement with a prime mover.

*Major units*

With reference to Figures 1, 2 and 3 specifically, it will be seen that the present preferred embodiment of my invention comprises eight cooperative major units designated generally by numerals 1 to 8, inclusive. Referring to these units respectively: 1 is an actuatable primary clutch or coupling; 2 and 3 are actuatable secondary clutches or couplings; 4 is a planetary gear unit; 5 is an actuatable brake which includes a one-directional restraining device; 6 is another planetary gear unit; 7 is an automatic operating unit; and 8 is a manual control unit.

*Structural elements*

Now describing the apparatus in detail, reference will first be made to Figure 1. Reference numeral 9 designates a housing or frame for the mechanism in general. Numeral 10 designates a clutch backing plate, which may also serve as a flywheel for a prime mover and which may be drivably secured to and supported by a shaft 11 of a prime mover, as by bolts 12. Drivably secured to the backing plate, as by bolts 13, is a clutch plate carrier frame 14. The bolts 13 are accessible through an aperture 15 in housing 9, which aperture may be provided with a cover plate 16. Disposed within and carried by frame 14 is an axially movable clutch pressure plate 17 and an axially movable pressure reaction plate 18. The pressure plate and reaction plate are drivably and slidably supported in the carrier frame by a plurality of radially extended angularly spaced tongues 19 and 20, respectively, which are fittingly engaged in cooperating axially elongated apertures 21 in the circumferential wall of the carrier frame. Disposed between the pressure plate and the reaction plate are a plurality of angularly spaced radially slidable flyweights 22 (Figures 1 and 11), each of which are provided with a pair of rollers 23 which are trapped in a substantially axially directed aperture 24. The rollers annularly abut each other, while the opposite annulus of one abuts the pressure plate and the opposite annulus of the other abuts an axially inclined face of a key lug 25, which latter is affixed, as by welding, to the reaction plate. The flyweights are provided with a correspondingly inclined recess slot 26 which fittingly and slidably engages the sides of the key lugs to form a guide by which the spacing and alignment of the flyweights is maintained. As may be seen, the bottom of recess slot 26 is slightly clear of the inclined face of the key lug. Thus, the flyweights themselves do not react against the pressure plate or the key lugs. The flyweights are also provided with springs 27 which normally urge them inwardly to rest in abutment with an axially extended shoulder portion 28 of plate 18. The springs are disposed in counterbored chambers 29 in the flyweights and are provided with headed guide pins 30 wherewith they are adapted to react against flatted portions 31 of the inner surface of an axially extended annular rim 32 of pressure plate 17. The concentric inner surface of the rim serves as a diametral outward limiting stop for the flyweights and by its concentricity serves to maintain the dynamic balance of the assembly when the flyweights are thus stopped.

The pressure plate and reaction plate are urged toward one another by a plurality of springs 33 in combination with headed pins 34 which latter are carried by radially subtended lugs 35 provided on the pressure plate. The springs are trapped on the pins by a snap-ring 36 against which they react under a preload bias. A plurality of clutch pressure springs 37, also under preload bias, urges reaction plate 18 and its cooperative elements to the left, as viewed in the drawing, until normally it is stopped by means hereinafter to be described. These springs are disposed in chambers (undesignated) shown as formed in the reaction plate and the carrier frame.

Disposed between the clutch backing plate and the pressure plate is a clutch disc 38 which is provided with a pair of friction facings 39 which may be secured to the disc as by rivets 40. The clutch disc is preferably made of a spring material and is provided with a plurality of angularly spaced T shaped apertures 41 (Figure 12) in the portion adjacent to and between the friction facings. The edge portions 42 of the segments thus created by the apertures may then be bent alternately in opposite directions to produce the form shown in Figure 13, the friction facings being riveted alternately to those segments which are in major surface contact therewith. By this construction the clutch disc provides axially resilient yieldability, which tends to preclude grabbing and chatter when the clutch is being engaged.

The clutch disc is drivingly secured to a hub 43 in rotationally resilient manner by means of: a plurality of springs 44; a retaining plate 45; rivets 46; riveting spacer collars 47 (Figures 1 and 12); and a radially extended flange 48 of the hub. The flange is provided with a plurality of spaced angularly elongated apertures 47, in which collars 47 are disposed. The clutch disc and the retaining plate, disposed on opposite sides of the flange and collars, are secured to each other and retained against the flange by the rivets extending through the collars. The springs 44 are disposed under preload bias in other spaced apertures 50 correspondingly provided in the clutch disc, retaining plate, and the flange. The springs may be retained in the apertures by means of angular tabs 51 which are formed by partly severing and bending outwardly a segment of the clutch disc and the retaining plate appurtenant each aperture. The clutch disc is centralized on the hub by piloting thereon, as at 52. As will now be apparent, the construction is such that when driving force is applied, one side of the apertures in the clutch disc and retaining plate are biased against one end of the springs which in turn react against the opposing side of the apertures in the flange, and such action may be effected in either direction of rotation. The collars 47, being free to oscillate in the elongated apertures, are not adapted to affect a drive. Thus, the springs function torsionally to dampen transmission vibration and reduce objectionable noises.

Clutch hub 43 is carried by and drivingly splined or keyed to a stub shaft 53 which is journally supported in clutch backing plate 10 by a reduced end portion 54. Axially extending from and preferably integral with the stub shaft is an annular sleeve 55, which at its terminus is provided with a diametrically enlarged cup 56. Journally supported in the sleeve is one end of a main shaft 57. For purposes hereinafter to be described the main shaft is provided with three pressure fluid conducting channels designated 58, 59 and 60. For economy in manufacture these are preferably formed by a channeling element 61 (Figures 1 and 2) which may be installed, as by press-fitting, in a single bore in the shaft, the conduit ends being closed by solid end portions 62 of the element. Provided in sleeve 55 are internal annular recesses 63 and 64 which are provided with fluid directing ports 65 and 66 respectively. A port 67 in the shaft 57 communicates between channel 58 and recess 63, and a port 68 communicates between channel 59 and recess 64.

Externally affixed to the wall of cup 56, as by rivets 69 and riveting spacer collars 70, is a clutch drum 71. The latter, at one terminus, is provided with a hub 72 which is tightly fitted at 73 to the annulus of sleeve 55. The hub is counterbored to form a chamber 74, and this in conjunction with spacer collars 70 provides a chamber space communicating with port 66 and open to and beyond the periphery of cup 56.

Journally mounted on sleeve 55 is another annular sleeve 75 which at one end is secured to plate 18 by a snap-ring 76 and a tongue 77 of the plate, which latter is engaged with a slot 78 in the end of the sleeve. The opposite end of the sleeve is provided with a radially extended flange 79 and is counterbored to journally fit over hub 72 and to form a chamber 80 which communicates with the port 65 and which is provided with another port 81. Also provided in this sleeve is an internal annular recess 82 and a fluid escape port 83, the function of which will be hereinafter described. 84 designates a suitable oil seal or packing element.

Mounted on sleeve 75 is still another annular sleeve 85 which at one end is drivably secured to carrier frame 14 by means of a plurality of spaced axially extended tongues 86 which are engaged in corresponding fitting slots (undesignated) in the frame wall. Near its longitudinal center, sleeve 85 is provided with a radially extended flange 87 which forms another clutch backing plate and which is adapted to cooperate with a set of clutch discs 88 and 89. Slidably fitted to sleeve 85, at the opposite side of the clutch discs, is a pressure plate 90. The latter, on one side, is provided with a plurality of spaced axially extended tongues 91 (Figures 1 and 14) which are slidably engaged with corresponding fitting apertures 92 in flange 87. The tongues are also engaged with corresponding fitting slots (undesignated) provided in clutch disc 89, thereby drivingly supporting it. Clutch discs 88 are provided with spaced radially extended tongues 93 which are engaged with corresponding fitting apertures (undesignated) in the circumferential wall of a supporting drum 94 by which they are carried. One side of the drum is journally supported on sleeve 85 as at 95. Pressure plate 90, on the side opposite to the clutch discs, is provided with an axially extended rim 96 which forms a cylinder which is slidably fitted to the periphery of flange 79. Hence, plate 90 and flange 79 also constitute a piston and cylinder in combination with each other, and the space between them defines a fluid pressure chamber 90a. Plate 90 is normally urged to clutch released position by means of a preloaded spring 97 which may encompass sleeve 85, as shown, and which is disposed in a space provided internally of tongues 91. A snap-ring 98 limits the release movement of the plate to the required minimum. Sleeve 85 is counterbored to form a chamber 99 which communicates with port 81, and which also communicates with chamber 90a by means of a slot 100 in the end of the sleeve. Sleeve 85 is also provided with an internal annular recess 101 and a fluid escape port 102, the function of which will be hereinafter described. 103 designates another suitable oil seal or packing element.

Clutch discs 88 are preferably made of a spring material, and with reference to Figure 16 it will be seen that they are provided with a wave form whereby to produce axially resilient yield during clutch engagement, as with primary clutch unit 1 and for the same purpose.

Referring again to Figure 1, with the apparatus in the condition of rest, as it is shown, one end of sleeve 85 is in abutment with the wall of frame 14 while the opposite end is in abutment with flange 79. Also, reaction plate 18 is in abutment with snap-ring 76. Thus, the movement of plate 18 to the left (as viewed in the drawing) under bias of springs 37 is limited by the described abutments, as may readily be seen.

Primary clutch unit 1 and secondary clutch unit 2 are isolated from each other by a partition wall 104, which forms part of housing 9. The partition is provided with a chamber 105 which communicates with the port 102 of sleeve 85 and which at the bottom is provided with an opening 105a which forms a drain passage into the housing. A suitable oil seal or packing element 106 is provided in the bore of the partition to cooperate with sleeve 85. Thus, the primary clutch unit may be of the dry type while the secondary clutch units may be of the wet or liquid immersed type.

Drum 94 is drivingly secured to a sleeve 107 in rotationally resilient manner by means of a plurality of springs 108, a retaining plate 109, rivets 110, riveting spacer collars 111, a radially extended flange 112 of the drum, and a radially subtended flange 113 of the sleeve. The springs are retained in apertures by angular tabs 114. The arrangement, action and purpose of the structure is the same as described relative to clutch disc 38 and hub 43 and therefore need not be described again here.

Referring now to clutch drum 71, slidably fitted to the internal annulus of the drum and to the external annulus of cup 56 is a clutch pressure plate 115 which also constitutes a piston, and which is adapted to cooperate with a set of clutch discs 116 and 117. The space between the pressure plate and the wall of drum 71 defines a fluid pressure chamber 115a. At the opposite side of the clutch discs is a backing plate 118. Axially extending from pressure plate 115 are a plurality of spaced tongues 119 which are slidably engaged with corresponding fitted apertures 120 in backing plate 118. The tongues are also engaged with corresponding fitting slots (undesignated) in clutch discs 117 and thereby drivingly support them. Thus, the form, spacing and purpose of the tongues corresponds to that shown and described relative to clutch unit 2, except that the tongues are disposed externally instead of internally of the clutch discs. The clutch discs 116 are also preferably made of a spring material and are provided with a wave form, as shown in Figure 16 for clutch unit 2, and are carried by and splined, as at 121, to a formed hub 122. The latter in turn is carried by and splined to main shaft 57, as at 123, whereon it is axially fixed by a snap-ring 124 and abutment with a shoulder formed by the enlarged diameter of the shaft. Mounted on a reduced diameter hub extending from hub 122 is an anti-friction bearing 125 which is axially fixed thereon by abutment with the shaft shoulder and with a shoulder formed by a step on the hub. Mounted on the external annulus of the anti-friction bearing by a hub extension 126 is the clutch backing plate 118 which is axially fixed on the bearing by a snap-ring 127 and abutment with a radially subtended shoulder which is formed with internal clutch teeth 128.

Drivably secured to drum 71 by a radially extended flange 129 and engagement of a plurality of spaced fitting tongues and slots 130 is a ring gear 131 of a planetary gear unit. The gear is axially fixed to the drum in one direction by a snap-ring 132 and in the opposite direction by abutment with plate 118 which latter in turn abuts a shoulder 133 formed in the drum. As will now be seen, the drum, and hence the elements carried by it, are cooperatively axially fixed to the bearing 125, which latter is preferably of the radial-thrust type. Axially extended from the ring gear are a plurality of tongues 134 which are also drivingly engaged with the apertures 120 in plate 118.

Disposed in a space between the internal annulus of drum 71 and the external annulus of the ring gear, and encompassing the latter, is a preloaded spring 135 and a narrow ring 136. Under bias of the spring the ring abuts projected ends of tongues 119 and thereby normally urges pressure plate 115 to clutch released position wherein it is stopped, as shown, by its abutment with a shoulder step 137 formed in the wall of drum 71.

The first planetary unit comprises in assembly: the ring gear 131; a plurality of planet gears 138; a sun gear 139; planet gear shafts 140; and planet gear cage plates 141 and 142. The planet gears, enmeshed with the ring gear and the sun gear, are journaled on the shafts 140 which are fixedly supported in the cage plates 141 and 142. The latter are rigidly secured to each other as by rivets 143 and dowels 144, as shown and designated at the lower portion of the second planetary gear unit. Plate 142 is extended radially and is drivably and supportingly secured to sleeve 107 by engagement of a plurality of spaced fitting tongues 145 and slots 146. The axial location of the planet gear cage assembly is maintained by thrust washers 147 and 148, and the axial location of the assembly comprising drum 94 and sleeve 107 is maintained by abutment of the bottoms of slots 146 with tongues 145 at one end and by abutment of the opposite end with the face of a boss 149 provided on the housing partition. Cage plate 141 and sun gear 139 are provided with internal clutch teeth 150 and 151 respectively.

To simplify illustration and description, sun gear 139 is shown as integral with a brake drum 152, though it may as readily be affixed thereto by means such as riveting. Fitted to the external annulus of the drum 152 is an axially extended cup rim of a brake backing plate 153. The latter is supported in a fitting bore of housing 9 and together with the brake drum is stationarily fixed both axially and against rotation by means such as a plurality of bolts 154 spaced around the housing. Thus, it will be seen that the sun gear 139 is thereby held stationary to the housing.

Brake drum 152 is provided with an axially extended tubular hub 155 which is also provided with internal clutch teeth 156. This hub, like the sun gear, is shown integral with the drum, but it may as readily be affixed thereto by means such as riveting. Slidably fitted to the internal annulus of the drum and to the external annulus of hub 155 is a brake pressure plate 157, which also constitutes a piston, and which is adapted to cooperate with brake discs 158 and 159. The space between the pressure plate and the wall of drum 152 defines a fluid pressure chamber 157a. Plate 157 is provided with a plurality of spaced axially extended tongues 160 which, as with the plates of the clutches previously described herein, are slidably engaged with corresponding fitting apertures in backing plate 153 and with slots in brake disc 159, which latter is torsionally supported thereby. Brake disc 159 may also be made of a spring material and provided with a wave form such as shown in Figure 16. A preloaded spring 161, encompassing hub 155 and trapped by a snap-ring 162, normally urges pressure plate 157 to brake released position where it is stopped, as shown, when its hub 163 abuts the wall of the drum.

Brake disc 158 is in the form of a flanged cup and is affixed, as by rivets 164, to the external shell 165 of a one-directional restraining device. The latter comprises (Figures 1 and 15): a roller cage 166; a plurality of rollers 167; flatted portions 168 provided on hub 155 to cooperate with the rollers; and pins 169 secured in the cage and which urge the latter to roller lock position under bias of springs 170 trapped in recesses 171 provided in the hub. Relief depressions 172 in flatted portions preclude the rollers from locking in the free running direction under any conditions. Although the one-directional restraining device herein shown and described is of the common and conventional pinch-roller type, it is to be understood that a ratchet or other type of one-directional restraining means may be substituted without departing from the scope of my invention.

Provided on the periphery of shell 165 are external clutch teeth 172 which are formed as gear teeth and which are adapted to mesh with the internal teeth of a ring gear 173 of the second planetary gear unit. The latter unit comprises in assembly: the ring gear 173; a plurality of planet gears 174; a sun gear 175; planet gear shafts 176; and planet gear cage plates 177 and 178. The planet gears, enmeshed with the ring gear and the sun gear, are journaled on the shafts 176 which are fixedly supported in the cage plates 177 and 178. The latter are secured to each other as by the rivets 143 and dowels 144. Drivably and supportedly secured to ring gear 173 by engagement of a plurality of spaced fitting tongues and slots 179 is a shifter plate 180. The plate is axially secured to the gear by a snap-ring 181 and by abutment of its tongues with the bottom of the slots in the gear. The axial location of the ring gear and the sun gear relative to the planet gear cage is maintained by thrust washers 182, 183, 184 and 185.

Sun gear 175 is journally supported on main shaft 57 by an axially extended tubular hub 187 which, adjacent its terminus, is provided with external clutch teeth 188 which are adapted to selectively engage any of the clutch teeth 128, 150 or 151. Cage plate 177 is provided with a tubular hub which extends into the hollow interior of brake drum hub 155 and which, adjacent its terminus, is provided with external clutch teeth 186 which are adapted to engage teeth 156 of hub 155. Cage plate 178 and shifter plate 180 are provided with internal clutch teeth 189 and 190, respectively, which are adapted to selectively engage external clutch teeth 191 and 192, respectively, provided on shaft 57.

Although the gears and toothed clutches, as herein disclosed, are indicated as having straight teeth, it is to be understood they may as readily be provided with helical teeth, the clutch teeth then having helix angles which thrust-compensatingly cooperate with the angles of the gear teeth.

Sun gear 139 and drum hub 155 are provided with internal annular recessed portions 193 and 194 and a plurality of lubricating ports 195 and 196. The ports are angularly spaced around the gear and hub so that irrespective of the rotated position in which the unit may be fixed at assembly one set of ports will be aligned with the direction of the force of gravity.

Sun gear hub 187 is provided with internal annular recessed portions 198 and 198a and lubricating ports 199 and 200, the latter being in the form of a narrow axial slot through one of the remaining bearing portions. A lubricating port 201 also is provided in the sun gear. Shown by dotted line circles in shaft 57 are lubricating fluid directing ports 202 and 203 which communicate with shaft channel 60. The lubricating method and manner will be hereinafter described.

A hub of shifter plate 180 is provided with an external annular recess 204 which is adapted to receive a shifter fork 205. The fork is slidably supported by a foot 206 on a fluid conduit tube 207 and is slidably mounted and guided on a shifter rail 208 (Figure 2). The latter is secured in a boss (not shown) in the housing end plate 209 which latter in turn is secured to the housing as by bolts 210.

To simplify illustration and description the various journaled elements, as herein disclosed, are shown without bearing bushings. However, it is considered obvious that such bushings may be applied where required. Also, it is to be observed that piston rings, though undesignated, are shown in conjunction with the clutch and brake pressure plates which constitute pistons.

Describing now the automatic operating unit 7, reference will be made to Figures 1, 2, 8 and 9. Comprised in assembly is: an element supporting body 212, which may be secured to housing end plate 209 as by bolts 211; a pressure fluid directing manifold 213; a seal plate 214; a pump stator 215; a pump rotor 216; a pump chamber body 217; a piston valve 218; a fluid escape port regulating screw 219; a core valve 220; a primary fluid pressure govering and relief valve 221; a piston and governing valve spring 222; a secondary fluid pressure governing and relief valve 223; a secondary governing valve spring 224; a pressure fluid directing main valve 225; a main valve operator comprising pistons 226, 227 and 228 and a piston core tube 229 which carries a shouldered plunger rod 230; a piston reaction spring 231; a plunger pressure spring 232; a valve yoke 233; and a cut-off valve 234. The various pistons and valves are slidably disposed in bores 235, 236, 237, 238 and 239 formed in supporting body 212.

The fluid directing manifold 213 fittingly encompasses shaft 57 and is provided with internal annular recesses 240, 241 and 242 which register respectively with ports 243, 244 and 245 provided in the shaft. The latter ports communicate respectively with shaft channels 58, 59 and 60.

The fluid pump is of the eccentric stator type, and the rotor is provided with a plurality of spaced radially slidable vanes 246 the ends of which are sustained in contact with and follow the internal contour of the stator when the pump is in operation. The rotor is in slidable contact with the stator at point 247, thus here forming a pressure trap. A suction chamber 248 is defined on one side of a center line passing through point 247 and the pump axis, and a pressure chamber 249 is defined on the opposite side thereof. The chambers thus defined openly communicate respectively with radially formed recess chambers 250 and 251 provided in the pump chamber body 217. Communicating with an extended portion of chamber 250 is a fluid intake port 252 provided in the pump stator. Communicating with extended portions of chamber 251 are fluid pressure output ports 253 and 254 also provided in the stator. Ports 252, 253 and 254 are registered with corresponding ports (not shown) in seal plate 214 to communicate with channels formed in supporting body 212, which will hereinafter be more fully described. Also provided in the pump chamber body is an annular recess channel 255 which is substantially radially aligned with the bottom portions of the vane slots in rotor 216 and in open communication therewith beneath the vanes. This channel communicates with pressure chamber 251 by means of a port 256.

The pump rotor 216 is carried by and drivably keyed or splined to shaft 57 as at 257. The pump stator 215 and chamber body 217 may be secured to supporting body 212 as by rivets 258. The rotor is closely rotatably fitted between seal plate 214 and chamber body 217. Shaft 57, at its drive output end, may be journaled radially and fixed axially by an anti-friction bearing 259, which is preferably of the radial-thrust type. The bearing may be secured in a chamber of end plate 209 by abutment with the pump chamber body 217 at one side and a shoulder 260 of the end plate chamber at the other side. The shaft may be secured to the bearing by a nut 261 and a coupling element 262 which maintain a shoulder 263 of the shaft in abutment with the bearing. The bearing may be lubricated by oil seepage from the pump, and end plate 209 is provided with a drain channel 264 leading back into housing 9 to return excess fluid.

Referring now to the pistons and valves, bore 235 is provided at one end with a closure collar 265 in which one end of the core valve 220 is slidably fitted, and at its opposite end the bore is closed with a solid plug 266. The collar and plug may be retained by snap-rings 267 and 268 respectively. Near its longitudinal center the bore is slightly reduced in diameter to form a shoulder 269. Near its lower portion the bore is further reduced in diameter for a short distance to form a collar 270 in which the stem of governing valve 221 is slidably fitted and through which the stem extends to adjoin core valve 220 by entry into a counterbore of the latter, as at 271. The core valve is provided with a radially extended flange 272 at its lower terminus to support spring 222. The flange is spaced from the wall of the bore and may also be provided with slots 273 so as to effect no resistance or reaction to any fluid surrounding it. The bore carrying relief valve 223 is closed with a plug 274 which may be retained by a pin 275.

Bore 238 is provided at one end with a closure collar 276 in which the stem of plunger rod 230 is slidably fitted, and at its opposite end the bore is provided with another closure collar 277 in which core tube 229 is slidably fitted. The collars may be retained by snap-rings 278 and 279 respectively. Also provided in the bore, and associated with the pistons, are stop snap-rings 280 and 281. The pistons are slidably fitted in the bore and to the core tube and axially abut each other and collar 227 when at rest. The core tube 229 is provided with a radially extended flange 282 to support spring 231, and the flange rests in axial abutment with pistons 228. Plunger rod 230 is secured by a washer 283 to trap spring 232. The washer may be affixed to the rod by peening on the end thereof. Yoke 233 is preferably attached to main valve 225 by providing it with a forked end which is adapted to engage an external annular recess 284 formed in the valve.

Considering now the chambers, ports and channels associated with the pistons and valves, reference will primarily be made to Figure 8. The piston valve 218 is annularly recessed to form a chamber 285. A fluid trapping or dash-pot chamber 286 is formed by the piston bore between the piston terminus and the bore reduction 270. The piston valve is slidable in the bore and the bore shoulder 269 forms a limiting stop for it. Core valve 220 is provided with: an axially elongated escape port 287 at its upper end; a fluid conducting passage 288, closed at the upper end, but which continues through relief valve 221; and fluid directing ports 289 and 290. A tip extension of governing valve 221 is provided with slot formed inlet ports 291. Provided in bore 235 are fluid directing ports 292a, 293a and 294a which directly communicate respectively with fluid conducting channels 292, 293, and 294. Also provided therein are: fluid escape ports 295, 296 and 297; a fluid venting port 298; and a fluid inlet port 299, which latter directly communicates with fluid pressure output port 253 of the pressure pump. Escape port 296 is formed with a vertical continuation 296a. Escape port 297 also communicates with a fluid conducting channel 300 and with bore 236. The latter is provided with a fluid escape port 301. Channel 300 communicates with a port 302 in manifold 213 which in turn communicates with recess 242.

Main valve 225 is annularly recessed to form chambers 303, 304, 305, 306, 307, 308 and 309, and is tubularly formed to provide a fluid escape passage 310 through its length. Communicating with passage 310 are fluid escape ports 311 and 312. Provided in bore 237 are fluid inlet ports 313 and 292c. The former directly communicates with fluid pressure output port 254 of the pressure pump. (See Figure 9.) The latter directly communicates with fluid conducting channel 292. Also provided in the bore are fluid directing ports 314, 315, 316 and 317. As shown, port 314 comprises a channel which communicates with port 315, and the latter communicates with a port 318 in manifold 213 which in turn communicates with recess 240. Port 316 communicates with a port 319 in manifold 213 which in turn communicates with recess 241. Port 317 communicates with a port 317a of bore 239. The latter is also provided with a fluid directing port 317b and a fluid escape port 317c. The cut-off valve 234 is recessed to form a chamber 320 and is provided with a reduced diameter tip extension 234a which cooperates with the closed end of the valve bore and to provide a closing stop. Also, formed by the closed bore end and the valve terminus is a chamber 321.

The valve operating pistons 226, 227 and 228 are formed with annularly reduced portions to produce chambers 322, 323 and 324. And provided in bore 238 are fluid inlet ports 292b, 293b and 294b which directly communicate respectively with fluid conducting channels 292, 293 and 294. Also provided are fluid venting ports 325 and 326 to vent any fluid which may seep into the spring chambers.

A channel 327 communicates at one end with pump fluid intake port 252 and at the opposite end with a port 328 which is connected to an intake conduit tube 329 (Figure 1). The latter, at its opposite end, is connected to a port 330 of a strainer support 331 provided in housing 9. Disposed in the support is a strainer 332, which will hereinafter be described. The conduit tube 207 is connected at one end to fluid directing port 317b and at the opposite end to a fluid inlet port 333 which communicates with the pressure chamber 157a of clutch unit 5.

It is to be noted that the various fluid ports and conducting channels shown semi-diagrammatically in Figure 8 are formed integrally in the face of the supporting body 212 which abuts seal plate 214, and the supporting body is preferably a die casting. The seal plate, being secured in firm contact with a plane face of the supporting body, isolates the channels one from another. A portion of three of the channels are thus shown sectionally in Figure 1, as will be observed. But for clarity of disclosure in a plan view the semi-diagrammatic illustration is preferable since an actual view of the channels and ports in their respective relation to the piston, valves and bores would present a compound of solid and dotted lines which would be difficult to read and which would serve to no advantage.

With reference to the escape port regulating screw 219, it is to be observed that this is accessible for adjustment through an aperture in housing 9 which is provided with a pipe plug 219a. Thus, the operating unit need not be detached from the housing for such adjustment. Also, it may be observed that screw 219 is shown slotted for a major portion of its length. By means of this slot the screw is sprung outwardly to provide an opening tension to frictionally maintain its adjustment in conventional manner. Figure 10 shows a modified arrangement of the regulating screw. In this, the screw, 219b, extends through the wall of housing 9 to which it is threaded, as at 334, and provided with a lock nut 335. As is apparent, with this arrangement the screw is directly accessible for adjustment externally of the housing.

Describing now the manual control unit 8 and its appurtenant elements, reference will be made to Figures 2, 3, 4, 5, 6, 7, and 18. Comprised in assembly is: an element supporting plate 336, which may be secured to housing 9 as by bolts 337; a mechanical clutch shifter cam 338; a valve controlling cam 339; a cam biasing spring 340; a ratchet wheel 341; a detent collar 342; a supporting stud 343; a cam lever and roller 344 and 345 respectively; a valve control arm 346; a lever and arm shaft 347; a gear quadrant 348; a quadrant arm 349; a cam lever arm 350; a ratchet operating pawl 351; a pawl spring 352; a ratchet latch pawl 353; a ratchet operating crank 354; a crank shaft 355; a crank arm 356; a valve push rod 357; a push rod bell crank 358; and a detent ball and spring 359 and 360 respectively.

Stud 343 is affixed to supporting plate 336 as by a nut 361. Shifter cam 338, which is preferably of the rack cam type, is journally supported on stud 343 and is provided with a hub 362 in which are gear teeth 363. The latter are enmeshed with mating teeth in quadrant 348. Ratchet wheel 341 is provided with a stepped hub 364 and is journally supported on hub 362 of the shifter cam whereon it is axially retained as by a snap-ring 365. Valve controlling cam 339 is preferably formed as a sheet metal stamping and is affixed to the hub 364 of the ratchet wheel as by press fitting and/or welding. The controlling cam is provided with a hub 366 which may be slotted, as at 367, to receive and secure one end of biasing spring 340. The opposite end of the latter may be secured to an anchor stud 368 which is suitably affixed, as at 369, to the wall of shifter cam 338 as by a shouldered end riveted therethrough. Stud 368 also functions as a cam bias stop in cooperation with a stop lug 370 on controlling cam 339 which latter lug is normally sustained in abutment with the former by the spring. The stop lug may also be secured to the wall of cam 339 by a shouldered end riveted therethrough.

Ratchet latch pawl 353 is pivotally secured to supporting plate 336 as by a headed stud 371 and is adapted to fall by gravity into latch engagement with teeth 372 of the ratchet wheel, though a spring may be added if preferred. As shown in Figure 6, the latch pawl may be provided with a slot 373 to form an alignment guide for the operating pawl 351. Provided on the latter is a laterally projected lug 374 by which it is adapted to lift and release the latch pawl when required, and which normally sustains the latter in released condition. The operating pawl is pivotally secured to crank 354 as by a headed stud 375. The pawl spring 352 is secured at one end to the pawl 351 and at the opposite end to a stud 376, which latter is suitably affixed to supporting plate 336. The spring is angularly biased to urge the operating pawl into ratchet engagement as well as upward, as viewed in the drawing. Crank shaft 355 is pivotally supported in the bore of a boss 377 of supporting plate 336. Crank 354 and crank arm 356 may be affixed to the shaft by cross-pins (undesignated).

Gear quadrant 348 is provided with a tubular hub 378 by which it is pivotally supported in the bore of a boss 379 of supporting plate 336. Arm 349 may be affixed to the hub as by a pin 349a. The gear quadrant is normally adapted to concurrently rotate both cams to selected positions. Detent collar 342 is preferably secured to the gear teeth 363 of the cam hub by means of internal mating teeth and is provided with positioning notches 380 which cooperate with ball 359. The latter and its spring are disposed in a boss 381 preferably formed integrally on supporting plate 336. Cam lever 344 is preferably adjoined to control arm 346 by an integral hub 382. Roller 345 is adapted to cooperate with the camming periphery of controlling cam 339, and a rounded end 383 of arm 346 is adapted to cooperate with a right-angled lower extension 384 of valve operating yoke 233. Lever and arm shaft 347 is pivotally supported in the bore formed in the tubular hub 378 of the gear quadrant. The cam lever and control arm 344 and 346 and cam lever arm 350 may be affixed to the shaft by cross-pins (undesignated). Valve push rod 357, which is provided with a stop collar 357a, is slidably supported in a boss 385 of supporting plate 336. This rod is adapted to control the valve 234 under actuation by bell crank 358. The latter may be pivotally affixed, as at 386, to lugs provided on the supporting plate. The means for operating the bell crank will presently be described.

Engaged in the track of shifter cam 338 is a roller stud extension 387 of a short arm 388 of shifter fork 205. The cam track is formed with substantially concentric portions for a short distance to each side of the radial lines designated "L," "R" and "N." The radial lines designate selective stations, and the concentric portions serve to prevent the cam from being inversely urged to rotate by any back pressure from the camming roller. In other words, were an inclined camming surface to remain in contact with the roller at selected stations, any back pressure from the roller would tend to rotate the cam. The concentric portions also provide leeway whereby the selected positions of the cam need not be critically defined or maintained. The track is also substantially concentric for the entire distance from radial line "F" counter-clockwise to its end, as viewed in the drawing, which concentric portion is designated 338a. Controlling cam 339, for the same reasons as described above, is provided with substantially concentric portions for a short distance to each side of the radial lines designated "B," "C" and "D." It is also substantially concentric for the entire peripheral distance from radial line "A" clockwise to reference numeral 389. The lines "A," "B," "C" and "D" of the cam also correspond to stations of main valve 225 and yoke 233 designated by similar characters in Figure 8.

With reference to Figure 18, other elements pertaining to the manual control system will now be considered. In this figure, the elements are principally illustrated diagrammatically. 390 designates a shifter lever, which may be pivotally affixed to housing 9 as at 391, and which may be the shifter lever of a motor vehicle. Associated with the shifter lever is an indicating quadrant 392 which also may be suitably affixed to housing 9. Shown inscribed on the quadrant are the characters "L," "R," "N," "1," "2," "3" and "4." These correspond respectively to the characters "L," "R," "N," "A," "B," "C" and "D" designating the cam radial lines described hereinbefore. Of the quadrant characters, "L" designates a locking condition, "R" designates a reverse drive, "N" designates neutral, and the numerals designate forward drive ratios. The shifter may be pivotally connected to quadrant arm 340 by a rod 393. 394 designates a prime mover, diagramatically illustrated, which may be an internal combustion engine, an electric motor, or other motion producing means. 395 designates a pivotally movable speed controlling element, which may be the throttle lever of an engine, a lever of a rheostat for an electric motor, or other speed controlling device. Element 395 may be pivotally connected to a manual control element 396 by means of a link 397. The manual control element may be the foot throttle of a motor car. An elongated aperture 398 in the link, cooperating with one of the pivot connections, provides a lost motion connection. Link 397 is also provided with a slidable washer 398a and a spring 399, which spring, abutting extended lugs 400 provided on the link, is preloaded with sufficient bias to move element 395 to its maximum speed position before lost motion movement of element 396 occurs. A retracting spring 401 may be provided to bias the elements toward minimum speed position. Element 396 may be pivotally affixed to the prime mover, as at 402, and connected by a rod 403 to crank arm 356. An elongated aperture 404 in the rod, cooperating with one of the pivot connections, provides another lost motion connection at this point. 405 designates a drive engagement controller, which may be pivotally affixed to housing 9 as at 406. The controller may be pivotally connected to cam lever arm 350 by a rod 407. An elongated aperture 408 in this rod, cooperating with one of the pivot connections, provides a lost motion connection. This allows arm 350 to be moved by cam 339 independently of rod 407. Formed at one end of rod 407 is a caming element 409 which is adapted to operate bell crank 358.

It may now be observed that with removal of nut 281 and bolts 210 the automatic operating unit 7 may be bodily detached from housing 9 without disassembling other elements of the apparatus. Also, with removal of bolts 337 the manual control unit 8 may similarly be detached without disassembling other elements of the apparatus. Thus, these units are readily accessible for repair or adjustment with economical facility.

In Figure 17 is shown the fluid strainer 332 for the pump intake. The strainer comprises: suitable cylindrically formed wire mesh screens 410; screen holding ferrules 411 and 412; and a core tube 413. The ferrules may be affixed to the tube and the screens as by soldering or brazing. The strainer is slidably supported, as shown, in the chamber of the holder 331 formed in the housing. Ferrules 412 are provided with apertures 414 and are spaced from each other to expose suction port 330. Ferrules 411 are closed. Therefore, fluid must be drawn through the screens and then through apertures 414 to reach the suction port. As may be seen, the strainer is retained in position endwise between a drain plug 415 and the opposite side wall of housing 9. The housing also forms a container for a supply of fluid. With removal of the drain plug the strainer is adapted to be withdrawn through the drain plug orifice for cleaning or other purposes.

Semi-diagrammatically illustrated in Figure 19 is a modified embodiment of the invention wherein the time controlled actuating system is adapted in a modified manner to an infinitely variable friction drive type of motion converting and transmitting apparatus. In this disclosure, numeral 416 designates a prime mover, diagrammatically illustrated. 417 designates a supporting base whereon the prime mover and appurtenant operating elements may be mounted and secured. The prime mover may incorporate a shaft 418 to which may be suitably drivably secured, as by pinning, a friction driving plate 419. Journally supported in brackets 420 and 420a, which may be integral with base 417, is a drivable output shaft 421 which may be axially secured to one journal bracket as by pinned collars 422 and which is disposed substantially at right-angles to shaft 418. Slidably carried by and drivably keyed to shaft 421 is a friction wheel 423. Suitably secured to the circumferential rim of the wheel may be a band of friction material 424 which is suitably sustained in friction drivable engagement with a cooperating axial face of driving plate 419. Provided in an axially extended hub of the wheel 423 may be an external annular recess 425 which is adapted to receive a fork 426, which is provided with a hub 426a, and which is suitably affixed, as by pinning, to a piston rod 427 of an actuating cylinder 428. The piston rod may be slidably supported at one end in a bracket 429, which may be integral with base 417. The opposite end of the rod is disposed in the actuating cylinder wherein it is suitably secured to a piston 431, which latter is slidably fitted in the cylinder. The cylinder may be rigidly secured to a bracket 432, which also may be integral with base 417. The actuating cylinder comprises: an end cap 433; a piston reaction spring 434; a fluid inlet port 435; and an inlet port regulating screw 436.

Secured to journal bracket 420, as by bolts 437, is a fluid pressure pump, generally designated 438. This pump may be similar in structure and operation to that disclosed in the first described embodiment of the invention, except that here it is adapted to pump air instead of liquid as a fluid medium. The pump comprises: a rotor 439; slidable rotor vanes 439a; an eccentric stator 440; a chamber body 441, which also forms a pump cover; a wall bearing plate 442; a suction chamber 443; a pressure chamber 444; a fluid intake port 445; a fluid output port 446; a fluid pressure governing valve 447; a governing valve spring 448; a spring and valve retaining collar 449; and a fluid escape port 450.

The pump rotor is suitably keyed to shaft 421 as at 451. The pump fluid pressure may be conducted to actuating cylinder 428 as by a conduit tube 452. In lieu of lubrication, the pump stator, wall bearing plate, and chamber body may be made of an "oil impregnated bronze" or the equivalent such as is well-known commercially.

*Operation*

The operation of the apparatus may now be described. It is first to be observed that the fluid pressure pump cannot be in operation unless main shaft 57 is rotating. Therefore, fluid pressure to actuate the fluid operable elements is not created when the shaft is at rest, and as clutch units 2 and 3 (and also brake unit 5, but not for driving) depend on fluid pressure for engagement actuation, they will not be operative until such pressure is developed.

As best shown in Figures 1, 3 and 18, the driving and control elements are illustrated as in "neutral" (shifter lever indicator at "N"). In this condition it will be seen that none of the toothed clutches are engaged with one another. If now the prime mover is rotating below a substantially predetermined minimum speed, clutch backing plate 10 and all the elements drivably secured to it will also be rotating, but no rotation will be transmitted to clutch disc 38. If now the prime mover be accelerated to or above a substantially predetermined minimum speed, flyweights 22 will move outward under centrifugal force, overcoming the bias of springs 27 and 33, and cause rollers 23 to function as a roller wedge between the adjacent surface of pressure plate 17 and the inclined face of key lugs 25. Therewith the pressure plate will be moved to engage the facings of clutch disc 38 between it and the backing plate, and rotation will now be transmitted to the clutch disc and the elements drivably secured to it. If the flyweights have not become seated against the inner surface of pressure plate rim 32 when the pressure plate has moved as far as the thickness of the clutch disc and facings will permit, reaction plate 18 will recede, further compressing springs 37, until such seating of the flyweights is effected. Thus, not only is the engagement pressure properly limited by the springs 37, but, also, the movement imparted to the reaction plate when the clutch facings are new is sufficient to take care of all wear variation, so it is never necessary to adjust the clutch for such wear.

Under the conditions now in effect, sleeves 75 and 85, and hence clutch drum 71, ring gear 131 and planet gears 138 and their cage plates will be rotating, but since no fluid pressure is yet available to engage clutch unit 3, and none of the toothed clutches are engaged, no rotation can be transmitted to shaft 57, as may readily be seen.

Let it now be assumed that the shifter lever 390 be moved to the station designated "4" on its indicating quadrant. By this movement shifter cam 338 (Figure 3) will be rotated clockwise to the station where roller stud 387 of the shifter fork will be substantially at the end of the concentric portion 338a of the cam track. At the same time valve controlling cam 339 will be rotated to the station where its radial line "D" is aligned with cam roller 345. In this condition, cam lever 344 and its valve control arm 346 is free to rotate clockwise, as viewed in Figure 3, as far as the maximum movement of valve yoke 233 may require, that is, to the station thereof (Figure 8) which is correspondingly designated "D," and shifter fork 205 will be moved to the left, as viewed in Figure 1 (right in Figure 3). Therewith, planetary gear unit 6 will be moved to effect engagement of clutch teeth 188 with teeth 128, the teeth of ring gear 173 with clutch teeth 172, and teeth 189 with teeth 191. If now the prime mover be sufficiently accelerated to engage clutch unit 1, in the manner previously described, a first ratio drive will be transmitted to shaft 57 through clutch disc 38, sleeve 55 and clutch drum 71, ring gear 131, backing plate 118, sun gear 175, and planet gears 174 and cage plate 178. The ring gear 173, being engaged with clutch teeth 172, is stationarily restrained against rotation in the opposite direction by the one-directional restraining device which comprises rollers 167. Hence, the planet gears rollingly react against the ring gear to forwardly rotate their cage plates and thereby shaft 57 at the reduced speed (multiplied torque) ratio produced by such gearing.

With the type of fluid pressure pump herein disclosed and described, centrifugal force is relied upon to initially move the vanes 246 into contact with the stator, but after fluid pressure has been developed port 256 will conduct such pressure to channel 255 and therewith into the slots beneath the vanes to thereafter urge them outwardly by such pump output pressure. It is therefore to be observed that the pump is of a type which must be rotated at or above some minimum speed before it becomes effective, and which will again become ineffective, even while still rotating, when such rotational speed is reduced to a point at which its output volume and pressure is no longer adequate to effectively sustain the vanes in contact with the stator. For example, it may be arbitrarily assumed that the rotor must reach a minimum speed of 150 R. P. M. for the pump to become initially effective and that with reduction of the speed to 100 R. P. M. or less it again becomes ineffective. However, the actual performance speeds are of no concern in this invention.

With main shaft 57 and hence the pump rotor now rotating, when the shaft attains sufficient speed suction will be developed in pump chambers 248 and 250 to draw fluid thereinto through strainer 332, conduit 329, port 328, channel 327, and port 252, from the supply stored in housing 9. Thence the fluid will be carried by the rotor vanes to pressure chambers 249 and 251 wherefrom it will be conducted to the end chamber of governing valve 221 by the connected ports 253 and 299.

In Figure 2 the various pistons and valves are shown in first ratio condition, whereas, to facilitate description, Figure 8 shows them in second ratio condition. The first ratio condition is that in which the main valve 225 and valve yoke 233 are in the position designated "A" in Figure 2. In this position main valve chamber 303 will be in communication with port 314, thereby venting this port; chamber 304 will be in communication with port 313, thereby forming a closure for this port; chamber 305 will be in communication with port 315, thereby forming a closure for this port; chamber 308 will be in communication with port 316, thereby venting this port through escape ports 312 and passage 310; and chamber 309 will be in communication with port 292c and 317. Also, when at rest, governing valve 221 and piston valve 218 will be in the condition shown in Figure 2 wherewith the end chambers of piston valve 218 will be vented by port 287; port 289 will be closed by the piston valve; port 290 will be in communication with chamber 286; and ports 292a, 293a and 294a will be in communication with piston valve chamber 285, thereby venting these ports through port 295.

With reference to Figure 2, the pressure fluid, upon entering the chamber of valve 221, is next conducted to dash pot chamber 286 by ports 291, passage 288, and port 290. By this means the chamber 286 must be filled to capacity before further pressure can be developed. The substantially vertical extension 296a of escape port 296 functions as a standpipe whereby fluid may not later drain out by gravity through port 296. When now the pump fluid output volume becomes sufficient to exceed the escape capacity of port 296 and the normal leakage between the various moving or movable elements, it must move valve 221 against the bias of spring 222 sufficiently far to permit excess fluid to escape through port 297. Thus, fluid pressure is developed and governed in accordance with the bias of spring 222. With this movement of the governing valve and hence core valve 220, port 290 of the latter will now be closed by the bore of the piston valve 218, as shown in Figure 8, and the other core valve port 289 will now be opened into the end chamber of the piston valve. At the same time, the core valve escape port 287 will be closed by end collar 265. Thereupon, the fluid pressure will overcome the bias of spring 222 and motivate the piston valve against the fluid substantially trapped in chamber 286 to progressively expose the fluid directing ports 292a, 293a and 294a respectively. The time required to so expose these ports successively is limited according to the adjustment of the regulating screw 219 of port 296.

When port 292a is exposed, as shown in Figure 8, the pressure fluid from port 289 will be conducted by channel 292 and port 292b to piston chamber 322 of the valve operating assembly, and by port 292c to chamber 309 of the main valve. When the pressure fluid enters piston chamber 322 it will overcome the bias of spring 231 and move piston 226 and its associated elements to the station at which the piston is stopped, as shown, by abutment with snap-ring 280. This effects the second ratio position "B" of the main valve by the valve yoke 233. Valve chamber 305 will still be in communication with port 315 and thereby continue to form a closure for this port; chamber 308 will still be in communication with port 316 and thereby continue to vent this port; chamber 309 will still be in communication with port 292c and 317; but chamber 304 will now be in communication with port 313 and 314. Hence, pressure fluid will now be conducted from pump output port 254 to the pressure chamber 90a of clutch unit 2 by port 313, chamber 304, ports 314 and 318, recess 240, port 243, channel 58, port 67, recess 63, port 65, chamber 80, port 81, chamber 99, and slot 100, and pressure plate 90 will thereby be motivated to engage its associated clutch discs between it and backing flange 87. It is important to here observe that the fluid pressure reaction between pressure plate 90 and the sleeve flange 79, with which it cooperates, urges the latter to the right and the other elements of the clutch to the left, as viewed in Figure 1. Therefore, since the sleeve 85 of the clutch unit is in axial abutment with the wall of carrier frame 14, and sleeve 75 of the flange is axially affixed to reaction plate 18 by the snap-ring 76, the reaction plate will also be moved to the right, still further compressing springs 37, until it is stopped by its abutment with the terminus of sleeve 85, the axial thrust of the latter being sustained by the carrier frame wall, as is apparent. Thus, by the withdrawal movement of reaction plate 18 clutch unit 1 will become disengaged by and with engagement of clutch unit 2. Also, since the axial pressure must react through the discs of clutch unit 2, as is further apparent, the latter will coact to engage progressively and proportionately as clutch unit 1 becomes disengaged, and vice versa. Upon engagement of clutch unit 2 a second ratio drive will be transmitted to shaft 57 from carrier frame 14 through sleeve 85, clutch discs 88 and 89, drum 94 and sleeve 107, planet gear cage plate 142 and planet gears 138, sun gear 139, ring gear 131, backing plate 118, clutch teeth 128 and 188, and thence through planetary gear unit 6, which latter remains effective to function in the manner previously described. Thus, the second ratio is obtained by overdriving the first ratio gearing, this being the present function of planetary gear unit 4 wherein the planet gears will now rollingly react against the stationary sun gear to forwardly rotate the ring gear at an increased speed ratio, in an obvious manner.

As previously mentioned, chamber 309 of the main valve is at this time still in communication with port 317. Therefore, pressure fluid is now also conducted from port 292c to the pressure chamber 157a of brake unit 5 by ports 317 and 317a, chamber 321, port 317b, conduit 207, and port 333, and pressure plate 157 will thereby be motivated to engage its associated brake discs between it and backing plate 153. When the discs of brake unit 5 are engaged the one-directional restraining device, and hence ring gear 173, is restrained from over-running and shaft 57 is thereby restrained from coasting.

Upon elapse of such time interval as may be substantially established by the adjusted fluid escape capacity of port 296 piston valve 218 will have moved sufficiently far to also expose port 293a. Thereupon, pressure fluid will be conducted by channel 293 and port 293b to piston chamber 323 thereby further overcoming the bias of spring 231 to move piston 227 and its associated elements (except piston 226, which remains where it is and cooperates in reaction) to the station at which it is stopped by abutment with snap-ring 281. This effects the third ratio position "D" of the main valve. Valve chamber 304 will now be in communication only with port 314, and chamber 305 only with port 313, thereby forming separate closures for each of these ports; chamber 306 will now be in communication with port 315, thereby permitting the latter to vent through escape ports 311 and passage 310; chamber 309 will now be in communication with ports 316 and 292c; while port 317 will now be exposed to the open valve bore 237 wherethrough it is freely vented. In this condition, clutch unit 2 will again be released, as is apparent, and clutch unit 1 thereby again become engaged. The disc brake unit 5 will also be released. Pressure fluid from port 292c will now be conducted to the pressure chamber 115a of clutch unit 3 by chamber 309, ports 316 and 319, recess 241, port 244, channel 59, port 68, recess 64, port 66, and chamber 74, and pressure plate 115 will thereby be motivated to engage its associated clutch discs between it and backing plate 118. Upon engagement of clutch unit 3 a third ratio drive (which in this case is a direct drive) will be transmitted to shaft 57 through clutch disc 38, sleeve 55 and clutch drum 71, clutch discs 116 and 117 and backing plate 118, and hub 122 and spline 123. Planetary gear unit 6 is now free to revolve ineffectively.

Upon a still further elapse of time, piston valve 265 will have moved sufficiently far to also expose port 294a. Pressure fluid will then be conducted by channel 294 and port 294b to piston chamber 324 thereby still further overcoming the bias of spring 231 to move piston 228 and its associated elements (except pistons 226 and 227, which remain where they are and cooperate in reaction) to the station at which it is stopped by abutment of the terminus of core tube 229 with collar 276. This effects the fourth ratio position "D" of the main valve. Valve chamber 305 will now be in communication with ports 313 and 314; chamber 307 will be in communication with port 315, thereby forming a closure for this port; and chamber 309 will still be in communication with ports 292c and 316. Thus, clutch unit 2 will again be engaged and clutch unit 1 thereby released in the manner previously described, while clutch unit 3 will remain engaged. In this condition a fourth ratio drive will be transmitted to shaft 57 from carrier frame 14 through clutch unit 2, planetary gear unit 4, and clutch unit 3, by the means previously described. It will therefore be apparent that the fourth ratio is produced by thus overdriving shaft 57 somewhat as the planetary gearing of unit 6 was overdriven to produce the second ratio.

When pressure fluid is introduced into the chambers 80 and/or 99 of sleeves 75 and 85, any fluid which may leak through the bearing annulus of these sleeves will be received by the recesses 82 and 101 and conducted pressureless back into housing 9 by ports 83 and 102, partition chamber 105, and passage 105a.

When the speed of shaft 57, and therefore the pump rotor, is sufficiently reduced to render the pump fluid output volume and pressure inadequately effective, as previously described, spring 222 will move governing valve 221 back to the position shown in Figure 2. Therewith, escape port 287 will again communicate with the end chamber of piston valve 218, and spring 222 will also move the piston valve back to the position shown in Figure 2. Thereupon, ports 292a, 293a and 294a will again communicate with valve chamber 285 and be vented by port 295. Spring 231 will then move the main valve operator pistons and hence main valve 225 back to position "A." If the pump be decelerated slowly, after reduction of its speed to the point of inadequate output, piston valve 218 may recede gradually, leaving one or more of ports 292a, 293a or 294a exposed and effective if shaft 57 is again accelerated before being brought to rest. But whether such recession of the piston valve proceeds slowly or rapidly the performance will be suitable to the purposes of the invention.

Particular attention is here directed to another function of the pressure governing valve in the present operating system. Since, as described, the piston valve 218 will not be motivated until the governing valve is moved and sustained sufficiently far to effect such piston motivation, it is obvious that fluid pressure corresponding to the bias value of spring 222 must be developed before any pressure fluid can be conducted by port 292a. Hence, pressure fluid to actuate the clutches cannot be delivered to them until or unless the pressure is up to the minimum required for their safe and proper operation. If pressure fluid could be delivered to them at less than such required minimum pressure, they would be subject to serious damage from over-heating induced by excessive slippage.

Considering now the further operations of the manual control unit, reference will be made to Figures 2, 3, 4, 5, 6 and 18. First, let it be assumed that shifter lever 390 has been set at indicator station "4," as previously described, and that main valve 225 is now in the fourth ratio position "D." If the lever now be moved to station "3," shifter cam 338 will be rotated counterclockwise, but shifter fork roller stud 387 will not be moved as it will remain in the concentric portion 338a of the cam track, and controlling cam 339 will be rotated to the station where its radial line "C" is aligned with cam roller 345. By this rotation, the rise of the cam from radial line "D" to "C" will rotate lever and arm 344 and 346 to depress valve yoke 233 and plunger rod 230 to the third ratio position "C," the plunger rod being depressibly movable independently in core tube 229 by further compressing spring 232. The positioning relationship between cam 339 and yoke 233 is such that the cam rises define and properly establish the correspondingly designated positions of the main valve and yoke when the cam is in effect. It will now be apparent that if the shifter lever 390 is further moved to station "2" or "1" the main valve will, in the manner just described, be moved back to the corresponding positions "B" or "A." Also, it will be apparent that if at the start of drive operation the shifter lever be set at a forward drive station other than "4" the drive ratios will change automatically from the first ratio up to, but not beyond, the ratio to which the shifter lever is set.

It is also to be noted that whenever main valve 225 is in position "A" and shaft 57 is rotating fast enough for the pump to develop sufficient fluid pressure to move piston valve 218 far enough to expose port 292a, such fluid pressure will be delivered to engage the disc brake of unit 5 the same as when the main valve was in position "B," for in either position "A" or "B" the chamber 309 is in communication with ports 292c and 317, as previously described. Hence, if the main valve be moved back to or is sustained in first ratio position "A" while shaft 57 is effectively rotating, coasting by overrunning of the one-directional restraining device will be precluded in first ratio also.

When shifter lever 390 is moved to indicator station "R," a reverse drive condition is established in the apparatus. With such setting of the shifter lever, controlling cam 339 will be rotated to one of the positions where its major concentric portion is adjacent cam roller 345 and therefore restricting main valve 225 to position "A," and shifter cam 338 will be rotated to the station where its radial line "R" is aligned with shifter fork roller stud 387. In this position the shifter fork will have moved planetary gear unit 6 to effect engagement of clutch teeth 188 with teeth 150, teeth 186 with teeth 156, and teeth 190 with teeth 192. When now primary clutch unit 1 is engaged, upon attainment of sufficient speed by the prime mover, a reverse drive will be transmitted to shaft 57 through clutch disc 38, sleeve 55 and drum 71, ring gear 131, planet gears 138 and cage plate 141, sun gear 139, sun gear 175, planet gears 174, ring gear 173, and shifter plate 180. The planet gears 138 now being driven by their ring gear and rollingly reacting against their sun gear will forwardly rotate their cage plates, and hence connected sun gear 175, at a reduced speed ratio. The cage plates of planet gears 174 are now held stationary by engagement of teeth 186 and 156. Therefore, the planet gears 174 now functioning as reversing idlers, the forwardly rotating sun gear 175 will drive ring gear 173 in the opposite direction at another reduced speed ratio. Thus, shaft 57 will be driven in a reverse direction by ring gear 173 through shifter plate 180, and at a satisfactorily reduced overall ratio.

When the shifter lever is moved to indicator station "L," shaft 57 will be locked against rotation in either direction. With this setting of the shifter lever, shifter cam 338 will be rotated to the station where its radial line "L" is aligned with shifter fork roller stud 387. In this position the shifter fork will have moved planetary gear unit 6 to effect engagement of clutch teeth 188 with teeth 151, teeth 186 with teeth 156, and teeth 190 with teeth 192. If the apparatus was previously in reverse drive condition the latter two sets of teeth will simply remain engaged, but be moved further along one another, for, as will be seen, clutch teeth 186 and 190 are sufficiently elongated to remain engaged at two stations. As now coupled, sun gear 175 is held stationary by sun gear clutch teeth 151, and planet gear cage plate 177 is held stationary by drum hub clutch teeth 156. Thus, planetary gears 174 and sun gear 175 are now locked to each other and thereby lock their ring gear 173. Since the ring gear is engaged with shaft 57 through shifter plate 180, the shaft is thereby correspondingly locked against rotation. This feature is of particular advantage for use as a parking lock when the apparatus is applied to a motor vehicle.

Referring now to the independent actuation of controlling cam 339, it will be seen that if the manual speed control element 396 be advanced sufficiently to exceed the lost motion travel allowed by aperture 404 in the connecting rod, further movement will then rotate crank arm 356. With the lost motion advance allowed by aperture 404 element 396 may first advance speed control element 395 to its maximum speed position. Thereafter, the further advance required to move arm 356 may be effected concurrently with further compression of spring 399 by virtue of the secondary lost motion travel allowed by link aperture 398. Let it be assumed that shifter lever 390 is now set at indicator station "4" wherewith radial line "D" of controlling cam 339 is aligned with cam roller 345. In this position the teeth 372 of ratchet wheel 341 will have been rotated clockwise to such position that the last tooth counterclockwise is cooperative with the hook of operating pawl 351. If crank arm 356 now be rotated, as recited above, the operating pawl will be moved downward, as viewed in the drawing, engaging the ratchet tooth adjacent its hook, and will rotate cam 339 independently of cam 338, further winding cam biasing spring 340. The maximum movement of the operating pawl will rotate the cam to the position where now its radial line "C" is aligned with cam roller 345, and at this point latch pawl 353 will fall into engagement with the ratchet tooth then aligned with its hook and retain the cam in such position. Main valve 225 will thus be depressed to position "C" in the same manner as previously described. If now control element 396 be fully retracted, it will in obvious manner rotate crank arm 356 back to the position shown in Figure 13 wherewith operating pawl 351 will again be lifted to the position shown, and its side lug 374 will also lift and release the latch pawl. Thereupon, spring 340 will restore cam 339 to its normal position. On the other hand, if, instead of being fully retracted, control element 396 is only partially retracted and then advanced again, pawl spring 352 will have lifted the operating pawl to the next adjacent ratchet tooth without releasing the latch pawl, and the succeeding advance of the control element will rotate the cam one station further. This procedure may be repeated until the first ratio position is established, and only when control element 396 is fully retracted, or brought close to full retraction, will the cam be released to return to its normal position. It is to be pointed out that pawl spring 352 is not alone strong enough to release latch pawl 353 against the friction holding it under the bias of cam biasing spring 340. It therefore requires additional bias, such as that provided by the control element retracting spring 401, to effect release of the latch pawl.

Referring now to the drive disengaging controller 405, this element is adapted to completely disengage and re-engage any drive connection to shaft 57 at any speed of the shaft. As apparent, the mechanism of the present device is such that when a driving connection has been established from the prime mover to shaft 57, and the latter has attained sufficient speed to effectuate the pressure pump, the rotation of the prime mover, and hence primary clutch unit 1, may be sustained by any "back drive" imparted to shaft 57. For example, if the device is operating on a motor vehicle, and the latter is descending a hill, shaft 57 normally being restrained from coasting in any ratio, the drive could not ordinarily be released until speed was reduced sufficiently for the primary centrifugal clutch to release in normal manner. For this reason the manually operable drive disengaging controller is provided. When the controller 405 is advanced sufficiently far, cam lever arm 350, and hence cam lever 344 and valve control arm 346, will be rotated to the position where main valve 225 is depressed to position "A." At the same time, the camming element 409 at the end of rod 407 will be moved across the cooperating arm of bell crank 358 causing it to rotate and move push rod 357 to the left, as viewed in Figure 2. Therewith, cut-off valve 234, which is normally biased open by fluid pressure from port 317a, will be moved to where its tip extension 234a abuts the bore end closure. In this position its chamber 320 is in comunication with both ports 317b and 317c, and the former will thereby be vented by the latter, while fluid directing port 317a will now be isolated from port 317b. The tip extension 234a prevents the valve from closing port 317a and thereby fluid pressure reopening bias is sustained against it. Under the conditions now in effect, it will be apparent that all of the fluid actuated clutches have been rendered ineffective. Therefore, shaft 57 will be free to coast forwardly, and any rotation imparted to it by the elements it was driving cannot now be transmitted back to sustain even for awhile the speed of primary clutch unit 1. If the driving speed of the prime mover now be sufficiently reduced by its speed controller, the centrifugally actuatable primary clutch will also release and drive disengagement will be complete. And when controller 405 is again retracted, all the elements will be automatically restored to their prior condition, in obvious manner (if no automatic changes normally effected by speed change have occurred), and the clutches which were released will again become engaged without clash or ill effect.

With a motion transmitting device of the type disclosed, in order to avoid objectionable heating and power loss resulting from excessive fluid agitation, it is preferable that the running elements be only slightly immersed in their lubricating liquid, if at all. Therefore, a system for circulatory lubrication by pressure should be devised and provided. In the present disclosure the operating pressure fluid is also used for lubrication and therefore is preferably a lubricating oil. But it is to be understood that the pressure operating means may readily be separate from the lubricating system and employ other fluid mediums. With reference to Figure 8, it will be seen that the excess fluid passed by the primary pressure governing valve 221 is conducted by port 297 to the chamber of the secondary pressure governing valve 223, which latter must be moved against the bias of spring 224 for the remaining excess fluid to escape through port 301. Thus, secondary fluid pressure is developed in accordance with the bias of spring 224, which pressure may be considerably less than the pressure required for clutch operation. The pressure fluid, or lubricant, under the pressure now developed is conducted to the elements requiring lubrication by channel 300, port 302, recess 242, port 245, channel 60, and ports 202 and 203. From port 202 the fluid ejects into recesses 198 and 198a of sun gear 173, some of it flooding adjacent moving elements and some passing through port 201 to lubricate planetary gear unit 6. From port 203 the fluid ejects into sun gear recess 197, some of it lubricating the sun gear bearings and some passing through port 200 to lubricate bearing 125, while the major portion passes through port 199 to flood recesses 139 and 194, and therefrom flows by gravity through the ones of ports 195 and 196 which are below (as described) to lubricate planetary gear unit 4 and the one-directional restraining device. It is of course apparent that any relatively moving surfaces not lubricated by the lubricating system are supplied with lubricant by the operating pressure ports and recesses associated with them.

With the apparatus of the present embodiment installed in a motor vehicle, should it become necessary to start the engine by pushing or towing the vehicle, this may be accomplished with shifter lever 390 set at indicator station "2" or "4." Assuming it is set at station "2," when the vehicle, and hence shaft 57 and the pressure pump, are set in motion and sufficiently accelerated, clutch unit 2 and disc brake unit 5 will become engaged in the manner previously described. Therewith, clutch unit 2, being directly connected to backing plate 10, will transmit rotation to the engine.

Considering now the operation of the modified embodiment of the invention illustrated in Figure 19, it may readily be seen that in this structure when the prime mover is set into motion driving plate 419 will transmit rotation to friction wheel 423 by its frictional engagement therewith. Thus, shaft 421, and hence the pump rotor, will also be set into rotation.

In this embodiment the fluid pressure required for actuation is but a fraction of that required for actuation of the clutches in the first described embodiment. Therefore, centrifugal force alone is sufficient to sustain as well as initially move the pump rotor vanes into contact with the stator.

As it is shown in the drawing friction wheel 424 is at its primary drive ratio position, which is defined by abutment of fork hub 426 with cylinder cap 433. With the pump now in operation, when shaft 421 attains a sufficiently high speed, fluid pressure delivered to the actuating cylinder will overcome the bias of spring 434 and move the piston and, in obvious manner, the rod and fork to move friction wheel 423 toward the circumference of driving plate 419 until it is stopped by abutment of the fork hub with the face of journal bracket 429, which latter defines the final drive ratio position. The maximum fluid pressure that can be developed is determined by the bias value of governing valve spring 448, and the rate of movement of piston 431 is substantially determined by the adjustment of regulating screw 436 which meters the flow of fluid into the cylinder. Thus, the variation of the drive ratio from the primary to the final ratio will be effected through a limited period of time, as with the previously described embodiment.

When the speed of shaft 421 is again sufficiently reduced (by deceleration of the prime mover) to render the pump fluid output pressure inadequately effective, spring 434 will move the piston back and, in obvious manner, return friction wheel 423 to its primary drive ratio position. In this return movement, the fluid in the cylinder will escape through the delivery conduit, freely passing the now ineffective pump rotor vanes.

Noteworthy features

Heretofore, in automatic motion converting and transmitting apparatus in general, it has been common practice to control and/or motivate or effect such automatic motion conversion, or ratio changing, by means of a speed responsive device, such as a flyweight governor, which is usually driven by or in speed relationship to the driven or ratio change receiving element of the apparatus. Under such system of operation, as is apparent, the change from one driving ratio to another must normally occur at substantially fixed driven element speeds. And when a device thus operated is used on a motor vehicle the normal performance alone is unsatisfactory for the reason that for rapid acceleration of the vehicle it is required that the higher torque ratios (reduced speed ratios) be advancingly sustained to higher vehicle speeds than the governor may be set for without making it unsuitable for the normal driving range. For example, it may be assumed that the final drive ratio (highest speed ratio), after being effected, should remain so effected down to a vehicle speed of 10 miles per hour, and it may also be assumed that at one time, for moderate acceleration, the higher torque ratios need only be sustained in advancing ratios through an acceleration range from rest up to 15 miles per hour (at which speed the final ratio is effected), while at another time, for rapid acceleration, the higher torque ratios should be sustained through an acceleration range from rest up to 40 miles per hour. Therefore, since the normal driving range may require that the speed responsive ratio changing means be normally set to effect the final ratio at a vehicle speed of 15 miles per hour and sustain such ratio down to 10 miles per hour, it has also heretofore been common practice to provide automatic auxiliary modifying means whereby to over-control the speed responsive device, usually relative to torque demand. It may be readily appreciated that such auxiliary means introduces added cost and complication, a greater number of parts, and requires more installation space. With the time limit controlled ratio changing means of the present invention no auxiliary modifying means is required to effect change from one ratio to another and to the final ratio at an infinite number of driven element speeds according to the rate of drive acceleration. For example, let it be assumed that with use in a motor vehicle the time limit controlled actuating means is set to effect the final ratio in 10 seconds, starting from rest. If then the vehicle be accelerated slowly, within the 10 second period it may attain a speed of only 10 miles per hour before the final ratio is effected. On the other hand, if it be accelerated rapidly, it may attain a speed of 40 or 50 miles per hour before the final ratio is effected. And it is apparent that each of the ratios preceding the final ratio will also be effected at proportionately higher speeds, which contributes to ideal performance. Also, another advantageous feature is that the final ratio under the automatic control may be sustained at a vehicle speed as low as approximately 5 miles per hour, according to conditions provided in the fluid pressure pump.

As stated hereinbefore, this invention is not concerned with the actual speeds at which the time limit controlled actuator becomes motivated or de-motivated, nor whether the piston valve 218 recedes slowly or rapidly. One reason for this will now be understood when the simplicity and ready facility of the manually operable over-control means is considered. This, of course, has no duty to perform relative to automatic effectuation of the drive ratios at various driven element speeds, but it provides a simple and convenient means whereby the primary drive ratio or others may be re-effected at any time whether or not the speed of the driven shaft has been reduced to the point where the piston valve has fully receded to its starting station.

It is also notable that with the novel arrangement of the planetary gear units and clutches in this invention four automatically effectuable forward drive ratios and an automatically operable primary drive engaging and releasing means are provided with only three actuatable clutches or couplings, whereas, in any former devices known to the inventor, which provide a similar number of automatic forward drive ratios plus such primary drive engaging and releasing means, four actuatable clutches has been the minimum required.

Also, the manner in which the two planetary gear units are adapted to function together to provide a suitably high reverse drive ratio is considered novel.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

Having described my invention, what I claim is:

1. In a motion converting and transmitting device, incombination with driving and drivable elements, transmission means effectuable to establish a drive between said elements at relatively variable ratio including a primary drive ratio, automatic ratio changing means normally conditioned to effect the primary drive ratio and automatically variable to a different condition which defines a different ratio, means including automatic motivating and timing means to automatically vary the condition of said ratio changing means responsive to the elapse of a limited time interval, and means whereby said ratio changing means is operable to automatically select, initiate and effect the change from one drive ratio to the other responsive to the elapse of said limited time interval.

2. In a motion converting and transmitting device, in combination with driving and drivable elements, transmission means effectuable to establish a drive between said elements at relatively variable drive ratio including a primary ratio and a final ratio, automatic ratio changing means normally conditioned to effect the primary drive ratio and automatically and progressively variable to a plurality of different conditions each of which defines a different drive ratio, means including automatic motivating and timing means to automatically and progressively vary the condition of said ratio changing means from the primary to a final condition responsive to the elapse of limited time intervals, and means whereby said ratio changing means is operable to automatically and progressively select, initiate and effect the change from one drive ratio to another responsive to the elapse of said limited time intervals.

3. In a torque converting and transmitting device, in combination with driving and drivable elements, transmission means effectuable to establish a drive between said elements at relatively variable torque ratio including a primary ratio, automatic ratio changing means normally conditioned to effect the primary torque ratio and automatically variable to a different condition which defines a different ratio, means including automatic motivating and timing means to automatically vary the condition of said ratio changing means responsive to the elapse of a limited time interval, and means whereby said ratio changing means is operable to automatically select, initiate and effect the change from one torque ratio to the other responsive to the elapse of said limited time interval.

4. In a torque converting and transmitting device, in combination with driving and drivable elements, transmission means effectuable to establish a drive between said elements at relatively variable torque ratio including a primary ratio and a final ratio, automatic ratio changing means normally conditioned to effect the primary torque ratio and automatically and progressively variable to a plurality of different conditions each of which defines a different torque ratio, means including automatic motivating and timing means to automatically and progressively vary the condition of said ratio changing means from the primary to a final condition responsive to the elapse of limited time intervals, and means whereby said ratio changing means is operable to automatically and progressively select, initiate and effect the change from one torque ratio to another responsive to the elapse of said limited time intervals.

5. Apparatus as defined in claim 1 including a variable speed mover, and wherein said transmission means comprises primary and secondary coupling means, and means whereby said primary coupling means is rendered effective upon acceleration of the speed of the prime mover to a substantially predetermined minimum.

6. Apparatus as defined in claim 1 wherein said transmission means comprises primary and secondary coupling means, a source of fluid pressure, and fluid pressure means to effectuate said secondary coupling means responsive to the influence of said ratio changing means.

7. Apparatus as defined in claim 1 wherein said transmission means comprises primary and secondary coupling means, and wherein said primary coupling means is automatically and independently effectuated by mechanical means.

8. Apparatus as defined in claim 1 wherein said transmission means comprises primary and secondary coupling means, and wherein said primary coupling means is automatically and independently effectuated by centrifugally influenced means.

9. In a device for transmitting motion from a prime mover to a drivable element in variable drive ratio, ratio varying elements, primary coupling means effectuable to transmit motion from the prime mover to the ratio varying elements and thereby to said drivable elements, secondary coupling means also effectuable to transmit motion from the prime mover to said drivable element, automatic means for rendering each of said coupling means effective or ineffective, means by which the primary coupling means is first rendered effective, a cooperative element by which an operating member of the primary coupling means is connected to an operating member of the secondary coupling means and by which the primary coupling means is automatically, progressively and proportionately rendered ineffective as the secondary coupling means is rendered effective.

10. Apparatus as defined in claim 9 wherein said primary coupling means is of the dry type and said secondary coupling means is of the wet type, mechanical means for effectuating the primary coupling means, a source of fluid pressure, and fluid pressure operating means for effectuating the secondary coupling means.

11. Apparatus as defined in claim 9 including a housing wherein the secondary coupling means is disposed and whereby it is separated from the primary coupling means by a partition, the said cooperative element by which an operating member of one coupling means is connected to the other being disposed to extend through said partition to provide said connection.

12. In a motion converting and transmitting device comprising driving and drivable elements, a pair of couplings actuatable to effect a drive between said elements at relatively different ratios, means whereby one coupling is effectively actuated prior to the other, independent means for actuating one coupling, independent means for actuating the other coupling, a cooperative element by which an operating member of one coupling is connected to an operating member of the other coupling and by which the first actuated coupling is automatically, progressively and proportionately rendered ineffective as the other coupling is rendered effective, thereby shifting the drive from one coupling to the other.

13. Apparatus as set forth in claim 12 including means whereby the first actuated coupling may be re-effectuated, and means whereby with such re-effectuation of the first actuated coupling the other coupling is progressively and proportionately rendered ineffective.

14. In a motion converting and transmitting device, in combination with driving and drivable elements, a plurality of coupling means actuable to effect a drive between said elements at relatively different ratios, limited time interval controlled actuating means for certain of said coupling means, centrifugal actuating means for at least one of said coupling means, the centrifugally actuated coupling means comprising an annular friction plate, an axially movable pressure plate and a stationary backing plate which are adapted to grip the friction plate therebetween, a pressure reaction member axially spaced from the movable pressure plate adjacent the side opposite from the friction plate, a plurality of radially movable flyweights disposed in the space between the reaction member and the movable pressure plate, a substantially axially transverse aperture through the flyweights, a pair of rollers fittingly disposed in said aperture in annular abutment with each other, a plurality of relatively narrow radially elongated axially extended lugs affixed to said reaction member and cooperative with said flyweights, the axial face of the lugs being angularly inclined, the arrangement being such that the annulus of one of the rollers disposed in the flyweight aperture abuts the inclined face of a lug, while the annulus of the other roller abuts the adjacent face of said movable pressure plate, the rollers thereby being adapted to cooperatively function as a rolling wedge to effectively actuate the movable pressure plate when said flyweights are urged radially outward by centrifugal force.

15. Apparatus as defined in claim 1 including means whereby the change from one ratio to the other is effected overlappingly and without interruption to the transmission of motion between said elements.

16. In a device which is adapted to transmit rotation in a forward or a reverse direction, driving and drivable elements, a plurality of coupling devices actuatable to effect a drive between said elements at relatively different ratios, automatic means operable to select and actuate certain of said coupling devices, a first and second planetary gear assembly each of which comprises a sun gear, an encompassing ring gear, planet gears, and a planet gear carrier, means whereby said gearing may selectively be connected to rotate said drivable element in a forward or a reverse direction relative to said driving element, the reverse rotation being rendered effective by instituting a first driving connection which is adapted to forwardly rotate the ring gear of said first planetary gear assembly and thereby its mating planet gears and planet gear carrier around a stationary sun gear, a second connection whereby last said planet gear carrier is adapted to forwardly rotate the sun gear of said second planetary gear assembly, a third connection whereby the planet gear carrier of said second planetary gear assembly is restrained from rotation and whereby the planet gears thereof are operable to rotate their mating ring gear in a direction opposite to that of their sun gear, and a fourth connection between last said ring gear and said drivable element.

17. In a device adapted to transmit motion in a forward or a reverse direction, driving and drivable elements including a plurality of friction clutches adapted to connect and disconnect certain of said elements, a planetary gear assembly comprising a sun gear, an encompassing ring gear, planet gears, and a planet gear carrier, an axial supporting element for the planetary gear assembly whereon it is axially shiftable as a single unit, means for selectively shifting said assembly to any one of a plurality of stations, means whereby when said assembly is shifted to one station connections are established wherewith said planetary gears are adapted to transmit rotation to said drivable element in the direction of rotation of said driving element, means whereby when said assembly is shifted to another station connections are established wherewith said planetary gears are adapted to transmit rotation to said drivable element in a direction opposite to the rotation of said driving element, and means whereby when said assembly is shifted to still another station a neutral condition is established wherewith said driving and drivable elements are effectively disconnected.

18. Means as set forth in claim 17 including means whereby when said planetary gear assembly is shifted to still another station connections are established wherewith said drivable element is physically restrained from rotation in either direction.

19. Apparatus as defined in claim 1 wherein the motion transmitted from said driving to said drivable element is normally in one direction through all drive ratios, an element manually shiftable to effect reversal of the motion transmitted to said drivable element, and manually operable means for selectively shifting said shiftable element.

20. Apparatus as defined in claim 1 including an element manually shiftable to any one of a plurality of stations, which element, when shifted to one station, establishes a neutral condition wherewith said driving and drivable elements are effectively disconnected, and which, when shifted to another station, establishes connections wherewith said drivable element is restrained from motion, and manually operable means for selectively shifting said shiftable element.

21. In a motion converting and transmitting device comprising driving and drivable elements and a source of fluid pressure, a plurality of couplings actuatable to effect a drive between said elements at selectively different ratios, centrifugally actuatable flyweight means to effectuate at least one of said couplings, manually actuatable mechanical means to selectively effectuate others of said couplings, fluid pressure actuatable means to selectively effectuate still others of said couplings including manually actuatable valvular means selectively operable to control said fluid pressure actuatable means, and means whereby said mechanical means and said valvular means may be separately actuated selectively by a manually operable controlling element commonly connected to both.

22. In a motion converting and transmitting device comprising driving and drivable elements, a plurality of couplings actuatable to effect a drive between said elements at selectively different ratios, manually actuatable mechanical means to selectively effectuate certain of said couplings, fluid pressure actuatable means to selectively effectuate others of said couplings including manually actuatable valvular means selectively operable to control said fluid pressure actuatable means, and means whereby said mechanical means and said valvular means may be separately actuated selectively by a manually operable controlling element commonly connected to both, said controlling element comprising camming means, a portion of which is engageable with an element adapted to actuate said mechanical means and a portion of which is engageable with an element adapted to actuate said valvular means.

23. In a motion converting and transmitting device comprising driving and drivable elements, a plurality of couplings actuatable to effect a drive between said elements at selectively different ratios, manually actuatable mechanical means to selectively effectuate certain of said couplings, fluid pressure actuatable means to selectively effectuate others of said couplings including manually actuatable valvular means selectively operable to control said fluid pressure actuatable means, automatic limited time interval controlled actuating means also adapted to actuate said valvular means, and means whereby said mechanical means and said valvular means may be separately actuated selectively by a manually operable controlling element commonly connected to both.

24. In a motion converting and transmitting device, in combination with driving and drivable elements and a frame whereby they are supported, a plurality of couplings actuatable to effect a drive between said elements at selectively different ratios, manually actuatable mechanical means to selectively effectuate certain of said couplings, fluid pressure actuatable means to selectively effectuate others of said couplings including manually actuatable valvular means selectively operable to control said fluid pressure actuatable means, automatic limited time interval controlled actuating means also adapted to actuate said valvular means, and means whereby said mechanical means and said valvular means may be separately actuated selectively by a manually operable controlling element commonly connected to both, said controlling element being unitarily mounted on a supporting element detachably secured to said frame.

25. In a motion converting and transmitting device comprising driving and drivable elements, means actuatable to transmit motion from the former element to the latter at relatively variable ratio, limited time interval controlled actuating means automatically operable to convert the motion from one ratio to another, said time interval controlled actuating means comprising a motion rate governing element automatically movable progressively to influence said actuating means, a drive element which upon attaining a sufficiently high speed causes said motion rate governing element to advance and which drive element, when its speed is sufficiently reduced, allows said motion rate governing element to recede.

26. Apparatus as defined in claim 1 including manually operable over-control means whereby any drive ratio may be manually selected and effected irrespective of the automatically urged condition of said ratio changing means.

27. Apparatus as defined in claim 2 including manually operable over-control means whereby any drive ratio may be manually selected and effected irrespective of the automatically urged condition of said ratio changing means.

28. In a device for transmitting motion from a variable speed prime mover to drivable elements in relatively variable drive ratio, a plurality of coupling devices selectively actuatable to effect a drive between said prime mover and drivable elements at relatively different ratios, automatic means for actuating said coupling devices whereby a series of drive ratios varying from a primary ratio to a final ratio may be automatically effectuated in progressive order, a manually operable control element movable to regulate the speed of said prime mover which element is movable to one position to effect the lowest speed of the prime mover and to another position to effect the highest speed thereof, means whereby said control element may be over-moved past its highest speed position, means connected with said control element whereby when it is so over-moved such drive ratio as is normally induced automatically may thereby be manually set back to the next ratio in regressive order, means whereby the ratio condition thus manually established may thereafter be sustained throughout a major portion of any speed regulating movement of said control element in either direction between its highest and lowest speed positions, means whereby when said control element is moved back to substantially its lowest speed position the drive ratio induced by automatic actuation may again become effective, and means whereby with each succeeding over-movement of said control element which is not followed by its movement back to substantially its lowest speed position the drive ratios normally induced automatically may be regressively and successively set back one ratio further.

29. Apparatus as set forth in claim 28 wherein the means connected with said control element includes a camming element movable to effect the set-back of said drive ratios, and releasable detent means cooperative with said camming element to sustain such set-back until release actuation is effected.

30. In a motion converting and transmitting device, including driving and drivable elements, a plurality of coupling means potentially providing forward drive connections between said elements at relatively different ratios, at least one coupling means which potentially provides a reverse drive connection between said elements, manually operable main control means actuatable to selectively render any of said coupling means effective or ineffective, manually operable auxiliary control means actuatable to selectively render certain of said forward drive coupling means ineffective superseding any effectuation by said main control means, a camming element actuatable by said main control means and adapted to render the reverse drive coupling means effective or ineffective, another camming element actuatable by both of said control means and adapted to render the forward drive coupling means effective or ineffective, and means whereby said last named camming element is movable in unison with said first named camming element when actuated by said main control means and movable independently thereof when actuated by said auxiliary control means.

31. In combination with driving and drivable motion transmitting elements, coupling means actuatable by fluid pressure to effect a drive between said elements, said coupling means requiring a prescribed minimum fluid pressure for proper operation, a source of fluid pressure and fluid pressure operating means for actuating said coupling means, governing means whereby the pressure of the fluid is limited to a predetermined maximum, and a pre-set fluid operation stop element which automatically acts to preclude actuation of said coupling means when said fluid pressure is below said prescribed minimum.

32. In combination with driving and drivable motion transmitting shafts, a plurality of coupling means associated with said shafts and actuatable by fluid pressure to effect a drive therebetween, a source of fluid pressure and limited time interval controlled fluid pressure operating means for actuating said coupling means, means for conducting fluid pressure to said coupling means, the conducting means including a plurality of axially directed fluid passages in one of said shafts and an encompassing manifold element fitted thereto whereby said passages are connected with said source of fluid pressure, said passages in shaft comprising an element axially disposed therein and which provides said plurality of passages.

33. Apparatus as defined in claim 1 including a source of lubricant, means for pressurizing said lubricant, and distributing means to supply the lubricant to said elements.

34. Apparatus as defined in claim 1 including a prime mover which to become effective must initially be set into motion by other moving means, and means whereby without auxiliary adjuncts or adjustment said prime mover may be set into movement inversely imparted to said drivable element.

35. In a motion converting and transmitting device, in combination with driving and drivable elements, transmission means effectuable to establish a drive between said elements at relatively variable ratio including a primary drive ratio and a plurality of other drive ratios, automatic operating means to effectuate said transmission means and to automatically vary the drive ratio, means whereby said operating means is automatically motivated when said drivable element attains a substantially predetermined minimum speed, and means whereby thereafter said operating means continues to function automatically and progressively to select, initiate and effect variation of the drive ratio from the primary to the final ratio whether or not the speed of said drivable element exceeds said minimum.

36. Apparatus as defined in claim 35 wherein said operating means is automatically caused to function regressively when said drivable element is retarded to a substantially predetermined maximum speed.

37. Apparatus as defined in claim 28 wherein the drive ratio automatic variation is automatically effectuated in progressive order by limited time interval controlled actuating means.

38. In a device for transmitting motion from a variable speed prime mover to drivable elements in relatively variable drive ratio, a plurality of coupling devices selectively actuatable to effect a drive between said prime mover and drivable elements at relatively different ratios, automatic means for actuating said coupling devices whereby a series of drive ratios varying from a primary ratio to a final ratio may be automatically effectuated in automatic progression, a manually operable control element movable to regulate the speed of said prime mover which element is movable to one position to effect the lowest speed of the prime mover and to another position to effect the highest speed thereof, means whereby said control element may be over-moved past its highest speed position, means connected with said control element whereby when it is so over-moved the drive ratio automatic progression will thereby be limited to one ratio less than the total number of ratios normally effectuable in said series, means whereby the ratio condition thus manually established may thereafter be sustained throughout a major portion of any speed regulating movement of said control element in either direction between its highest and lowest speed positions, means whereby when said control element is moved back to substantially its lowest speed position the drive ratio induced by automatic actuation may again become effective, and means whereby with each succeeding over-movement of said control element which is not followed by its movement back to substantially its lowest speed position the drive ratio automatic progression will be successively limited to one more ratio less than the total number of ratios normally effectuable in said series.

39. Apparatus as defined in claim 38 wherein the drive ratio automatic variation is effectuated in automatic progression by limited time interval controlled actuating means.

40. In a motion converting and transmitting device comprising driving and drivable elements, a plurality of coupling devices selectively actuatable to effect a drive between said elements at relatively different ratios, automatic means for actuating said coupling devices whereby a series of drive ratios varying from a primary ratio to a final ratio may be automatically effectuated in progressive order, a manually operable main control element comprising means whereby effectuation of any drive may be precluded or whereby drive ratio automatic variation may be limited at a selected ratio, a manually operable auxiliary control element movable to an effective position and a releasing position and having a free movement range between said positions, means associated with said auxiliary control element whereby when it is moved to its effective position such drive ratio as is normally induced automatically may thereby be set back to the next ratio in regressive order, means whereby the ratio condition thus manually established may thereafter be sustained throughout any movement of said auxiliary control element within its free movement range, means whereby when said auxiliary control element is moved to its releasing position the drive ratio induced by automatic actuation may again become effective, and means whereby with each succeeding movement of said auxiliary control element to its effective position which is not followed by its movement back to its releasing position the drive ratios normally induced automatically may be regressively and successively set back one ratio further.

41. Apparatus as defined in claim 40 wherein the drive ratio automatic variation is automatically effectuated in progressive order by limited time interval controlled actuating means.

42. In a motion converting and transmitting device comprising driving and drivable elements, a plurality of coupling devices selectively actuatable to effect a drive between said elements at relatively different ratios, automatic means for actuating said coupling devices whereby a series of drive ratios varying from a primary ratio to a final ratio may be automatically effectuated in automatic progression, a manually operable main control element comprising means whereby effectuation of any drive may be precluded or whereby drive ratio automatic variation may be limited at a selected ratio, a manually operable auxiliary control element movable to an effective position and a releasing position and having a free movement range between said positions, means associated with said auxiliary control element whereby when it is moved to its effective position the drive ratio automatic progression will thereby be limited to one ratio less than the total number of ratios normally effectuable in said series, means whereby the ratio condition thus manually established may thereafter be sustained throughout any movement of said auxiliary control element within its free movement range, means whereby when said auxiliary control element is moved to its releasing position the drive ratio induced by automatic actuation may again become effective, and means whereby with each succeeding movement of said auxiliary control element to its effective position which is not followed by its movement back to its releasing position the drive ratio automatic progression will be successively limited to one more ratio less than the total number of ratios normally effectuable in said series.

43. Apparatus as defined in claim 42 wherein the drive ratio automatic variation is effectuated in automatic progression by limited time interval controlled actuating means.

44. In a device for transmitting motion from a variable speed prime mover to a drivable element in relatively variable drive ratio, a drive transmitting device which is ineffective to transmit a drive when the speed of the prime mover is sufficiently reduced and which is adapted to effect a drive between said prime mover and drivable element when the speed of said prime mover is sufficiently increased, other drive transmitting devices comprising a plurality of coupling devices selectively actuatable to effect a drive between said prime mover and drivable element at relatively different ratios, automatic means for selectively actuating said coupling devices and to thereby automatically vary the drive from one ratio to another, means whereby when any drive is automatically effected between said prime mover and drivable element such drive will normally be automatically maintained effective when the speed of the drivable element exceeds a substantially predetermined minimum and be automatically releasable when the speed of said drivable element is decreased to a substantially predetermined maximum, a manually operable main control element comprising means whereby transmission of any drive under any conditions may be precluded or whereby drive ratio automatic variation may be limited at a selected ratio, and a manually operable auxiliary control element comprising means whereby any drive may be manually released at any speed of said drivable element.

45. Apparatus as defined in claim 44 wherein the drive ratio automatic variation is effected by limited time interval controlled actuating means.

46. Apparatus as defined in claim 44 including a source of fluid pressure and fluid pressure operable means for effectuating said coupling devices, and means whereby the drive ratio automatic variation is effected by limited time interval controlled actuating means.

References Cited in the file of this patent

UNITED STATES PATENTS

| Number | Name | Date |
|---|---|---|
| 1,199,640 | Vincent | Sept. 26, 1916 |
| 1,619,701 | Chorlton | Mar. 1, 1927 |
| 2,102,781 | Bieretz | Dec. 21, 1937 |
| 2,144,270 | Palmgren | Jan. 17, 1939 |
| 2,150,950 | Thoma | Mar. 21, 1939 |
| 2,169,523 | Fleischel | Aug. 15, 1939 |
| 2,171,534 | Banker | Sept. 5, 1939 |
| 2,183,761 | Aspinwall | Dec. 19, 1939 |
| 2,193,304 | Thompson | Mar. 12, 1940 |
| 2,197,536 | Burtnett | Apr. 16, 1940 |
| 2,203,743 | Parsons | June 11, 1940 |
| 2,204,919 | Tyler | June 18, 1940 |
| 2,223,716 | Bojensen | Dec. 3, 1940 |
| 2,228,082 | Krome | Jan. 7, 1941 |
| 2,235,673 | Dodge | Mar. 18, 1941 |
| 2,259,729 | Burtnett | Oct. 21, 1941 |
| 2,266,696 | Wettig | Dec. 16, 1941 |
| 2,461,218 | Lapsley | Feb. 8, 1949 |
| 2,516,208 | Hasbany | July 25, 1950 |
| 2,527,820 | Johnson | Oct. 31, 1950 |
| 2,530,200 | Hobbs | Nov. 14, 1950 |
| 2,531,996 | Voytech | Nov. 28, 1950 |
| 2,557,896 | Soule | June 19, 1951 |
| 2,597,245 | Kelbel | May 20, 1952 |
| 2,612,792 | Wilson | Oct. 7, 1952 |
| 2,629,265 | Dodge | Feb. 24, 1953 |
| 2,693,260 | Lucia | Nov. 2, 1954 |